US012223793B2

(12) United States Patent
Takahashi et al.

(10) Patent No.: US 12,223,793 B2
(45) Date of Patent: Feb. 11, 2025

(54) MEDIUM PROCESSING DEVICE AND METHOD OF CONNECTING UNITS IN MEDIUM PROCESSING DEVICE

(71) Applicants: LAUREL BANK MACHINES CO., LTD., Tokyo (JP); LAUREL MACHINERY CO., LTD., Osaka (JP); LAUREL PRECISION MACHINES CO., LTD., Osaka (JP)

(72) Inventors: Hiroaki Takahashi, Tokyo (JP); Hiroyuki Kumagai, Sakura (JP)

(73) Assignees: Laurel Bank Machines Co., Ltd., Tokyo (JP); Laurel Machinery Co., Ltd., Osaka (JP); Laurel Precision Machines Co., Ltd., Osaka (JP)

( * ) Notice: Subject to any disclaimer, the term of this patent is extended or adjusted under 35 U.S.C. 154(b) by 638 days.

(21) Appl. No.: 17/598,651

(22) PCT Filed: Mar. 25, 2020

(86) PCT No.: PCT/JP2020/013273
§ 371 (c)(1),
(2) Date: Sep. 27, 2021

(87) PCT Pub. No.: WO2020/203535
PCT Pub. Date: Oct. 8, 2020

(65) Prior Publication Data

US 2022/0189233 A1 Jun. 16, 2022

(30) Foreign Application Priority Data

Mar. 29, 2019 (JP) ................................ 2019-067631
Mar. 10, 2020 (JP) ................................ 2020-041286

(51) Int. Cl.

*G07D 11/40* (2019.01)
*B65H 7/02* (2006.01)
*B65H 31/06* (2006.01)
*G07D 11/16* (2019.01)
*G07D 11/18* (2019.01)
*G07D 11/20* (2019.01)
*G07D 11/235* (2019.01)

(Continued)

(52) U.S. Cl.
CPC ............... *G07D 11/40* (2019.01); *B65H 7/02* (2013.01); *B65H 31/06* (2013.01); *G07D 11/16* (2019.01);

(Continued)

(58) Field of Classification Search
CPC ........................... G07D 11/40; B65H 2402/10; B65H 2551/20; B65H 2701/1912; B65H 7/02
See application file for complete search history.

(56) References Cited

FOREIGN PATENT DOCUMENTS

CN 104112312 A 10/2014
CN 104794802 A 7/2015

(Continued)

OTHER PUBLICATIONS

International Search Report for PCT/JP2020/013273 mailed Jun. 16, 2020, 4 pages.

(Continued)

*Primary Examiner* — Jeremy R Severson
(74) *Attorney, Agent, or Firm* — Nixon & Vanderhye P.C.

(57) ABSTRACT

A medium processing device includes: a first unit; and a plurality of second units connected to the first unit. Each of the plurality of second units includes: a conveying mechanism that conveys a medium; and a medium detection portion that detects the medium being conveyed by the conveying mechanism and transmits a signal indicating detection of the medium to the first unit. The first unit determines connection order of the plurality of second units with respect to the first unit, based on the signal transmitted from each medium detection portion of the plurality of second units.

17 Claims, 16 Drawing Sheets

(51) Int. Cl.
*G07D 11/50* (2019.01)
*G07D 11/60* (2019.01)

(52) U.S. Cl.
CPC ............. *G07D 11/18* (2019.01); *G07D 11/20* (2019.01); *G07D 11/235* (2019.01); *G07D 11/50* (2019.01); *G07D 11/60* (2019.01); *B65H 2402/10* (2013.01); *B65H 2551/20* (2013.01); *B65H 2701/1912* (2013.01); *G07D 2211/00* (2013.01)

(56) References Cited

FOREIGN PATENT DOCUMENTS

| | | | | |
|---|---|---|---|---|
| CN | 105229708 | A | | 1/2016 |
| EP | 0675465 | A1 | | 10/1995 |
| EP | 3357846 | A1 | | 8/2018 |
| JP | 07-267513 | | | 10/1995 |
| JP | 2009-187487 | A | | 8/2009 |
| JP | 2013-186870 | | | 9/2013 |
| JP | 2013186870 | A | * | 9/2013 |
| JP | 2016-201046 | | | 12/2016 |

OTHER PUBLICATIONS

Chinese Office Action mailed Oct. 10, 2022 in Chinese Application No. 202080025197.8, with English translation of Chinese Search Report, 12 pages.

Extended European Search Report mailed Nov. 24, 2022 in European Application No. 20784870.6, 8 pages.

* cited by examiner

| ORDER OF PHYSICAL POSITION | UNIT TYPE | | CONNECTED PORT |
|---|---|---|---|
| STACKING UNIT 3 | STACKING UNIT (4 STACKING PORTIONS) | → | P1 |
| STACKING UNIT 4 | STACKING UNIT (3 STACKING PORTIONS) | → | P3 |
| STACKING UNIT 5 | STACKING UNIT (2 STACKING PORTIONS) | → | P2 |
| STACKING UNIT 6 | STACKING UNIT (1 STACKING PORTION) | → | P4 |

| ORDER OF PHYSICAL POSITION | UNIT IDENTIFICATION | UNIT TYPE |
|---|---|---|
| STACKING UNIT 3A | 003 | STACKING UNIT (4 STACKING PORTIONS) |
| STACKING UNIT 4A | 001 | STACKING UNIT (3 STACKING PORTIONS) |
| STACKING UNIT 5A | 002 | STACKING UNIT (2 STACKING PORTIONS) |
| STACKING UNIT 6A | 004 | STACKING UNIT (1 STACKING PORTION) |

MEDIUM PROCESSING DEVICE AND METHOD OF CONNECTING UNITS IN MEDIUM PROCESSING DEVICE

This application is the U.S. national phase of International Application No. PCT/JP2020/013273 filed Mar. 25, 2020 which designated the U.S. and claims priority to Japanese Patent Application No. 2019-067631, filed Mar. 29, 2019, and Japanese Patent Application No. 2020-041286, filed Mar. 10, 2020, the content of which is incorporated herein by reference.

TECHNICAL FIELD

The present invention relates to a medium processing device and a method of connecting units in a medium processing device.

Priority is claimed on Japanese Patent Application No. 2019-067631, filed Mar. 29, 2019, and Japanese Patent Application No. 2020-041286, filed Mar. 10, 2020, the content of which is incorporated herein by reference.

BACKGROUND ART

Conventionally, there is known a paper sheet processing device capable of adding a plurality of units having a function according to a user's request to the device main body (see, for example, Patent Document 1). In the paper sheet processing device disclosed in Patent Document 1, by connecting the device main body and a unit having one or more stacking portions, it is possible to add one or a plurality of stacking portions to the outside of the device main body, whereby paper sheets charged into the device main body can be sorted to the target stacking portion.

PRIOR ART DOCUMENTS

Patent Documents

[Patent Document 1] Japanese Unexamined Patent Application, First Publication No. H07-267513

SUMMARY OF INVENTION

Problem to be Solved by the Invention

Here, in this type of paper sheet processing device, it is necessary to connect each unit to the device main body in order in order to sort the paper sheets charged into the device main body to the target stacking portion. In the device main body, it is necessary to set the connection order of each unit. For this reason, for example, when the operator who installs the paper sheet processing device makes a mistake in the connection order of the wiring of each unit to the device main body, or makes a mistake in setting the connection order of each unit in the device main body, it is not possible to accurately sort the paper sheets charged into the device main body to the stacking portions of the target unit. Such a problem occurs not only in a paper sheet processing device for processing paper sheets, but also in other medium processing devices such as a coin processing device for processing coins.

Therefore, an object of the present invention is to provide a medium processing device and a method of connecting units in a medium processing device that can accurately and easily set the connection order of a plurality of units connected to the device main body.

Means for Solving the Problem

A medium processing device according to an aspect of the present invention includes: a first unit; and a plurality of second units connected to the first unit. Each of the plurality of second units includes: a conveying mechanism that conveys a medium; and a medium detection portion that detects the medium being conveyed by the conveying mechanism and transmits a signal indicating detection of the medium to the first unit. The first unit determines connection order of the plurality of second units with respect to the first unit, based on the signal transmitted from each medium detection portion of the plurality of second units.

A method of connecting units of a medium processing device according to an aspect of the preset invention is a method of connecting units of a medium processing device including a first unit and a plurality of second units connected to the first unit, and includes: receiving, from each of the plurality of second units, a signal indicating detection of a medium conveyed by the second unit itself; and determining connection order of the plurality of second units with respect to the first unit, based on order of the signal received from each of the plurality of second units.

Effect of the Invention

According to the present invention, it is possible to provide a medium processing device and a method of connecting units in a medium processing device capable of accurately and easily setting the connection order of a plurality of second units connected to the first unit.

EMBODIMENTS FOR CARRYING OUT THE INVENTION

<Medium Processing Device>

Hereinbelow, a medium processing device 1 according to the embodiment will be described with reference to the drawings.

Figure 1:
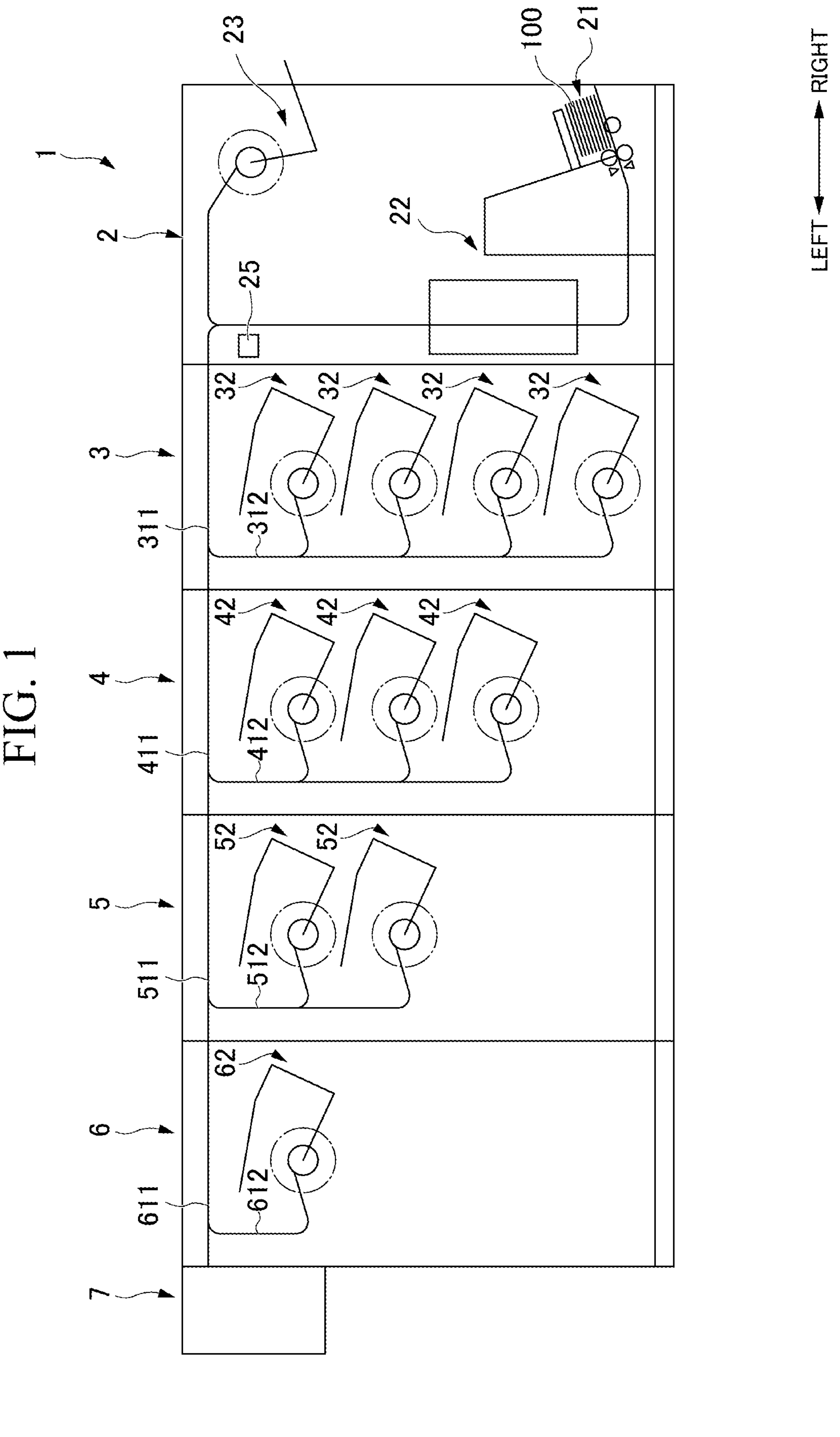
FIG. 1 is a schematic configuration diagram of the inside of the medium processing device according to the embodiment as viewed from the front side.

FIG. 1 is a schematic cross-sectional view of the overall configuration of the medium processing device 1 according to the embodiment as viewed from the front.

Figure 2:
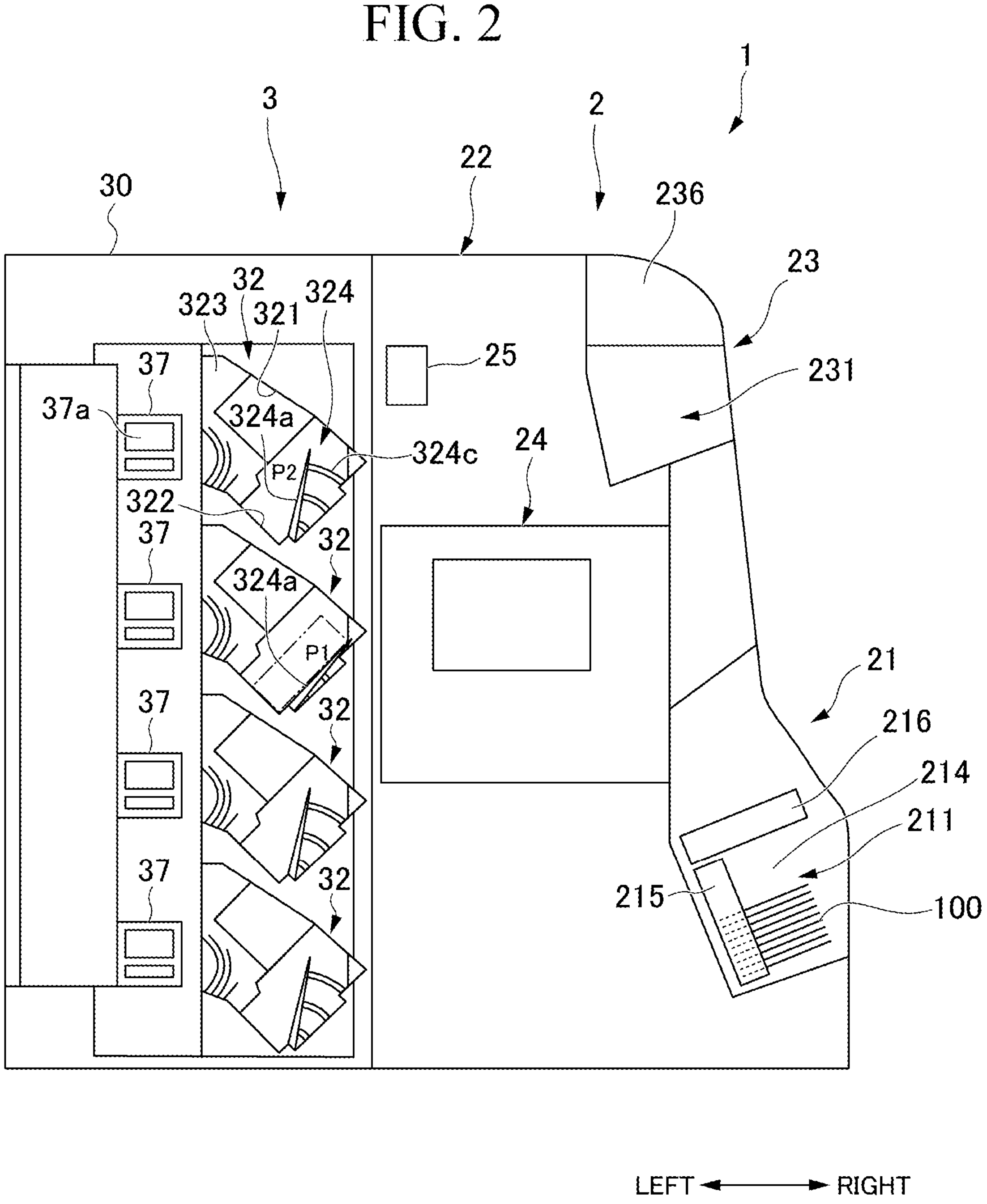
FIG. 2 is a front view showing a counting unit and a stacking unit of the medium processing device according to the embodiment.

FIG. 2 is a front view of a counting unit 2 and a stacking unit 3 of the medium processing device 1 according to the embodiment.

Figure 3:
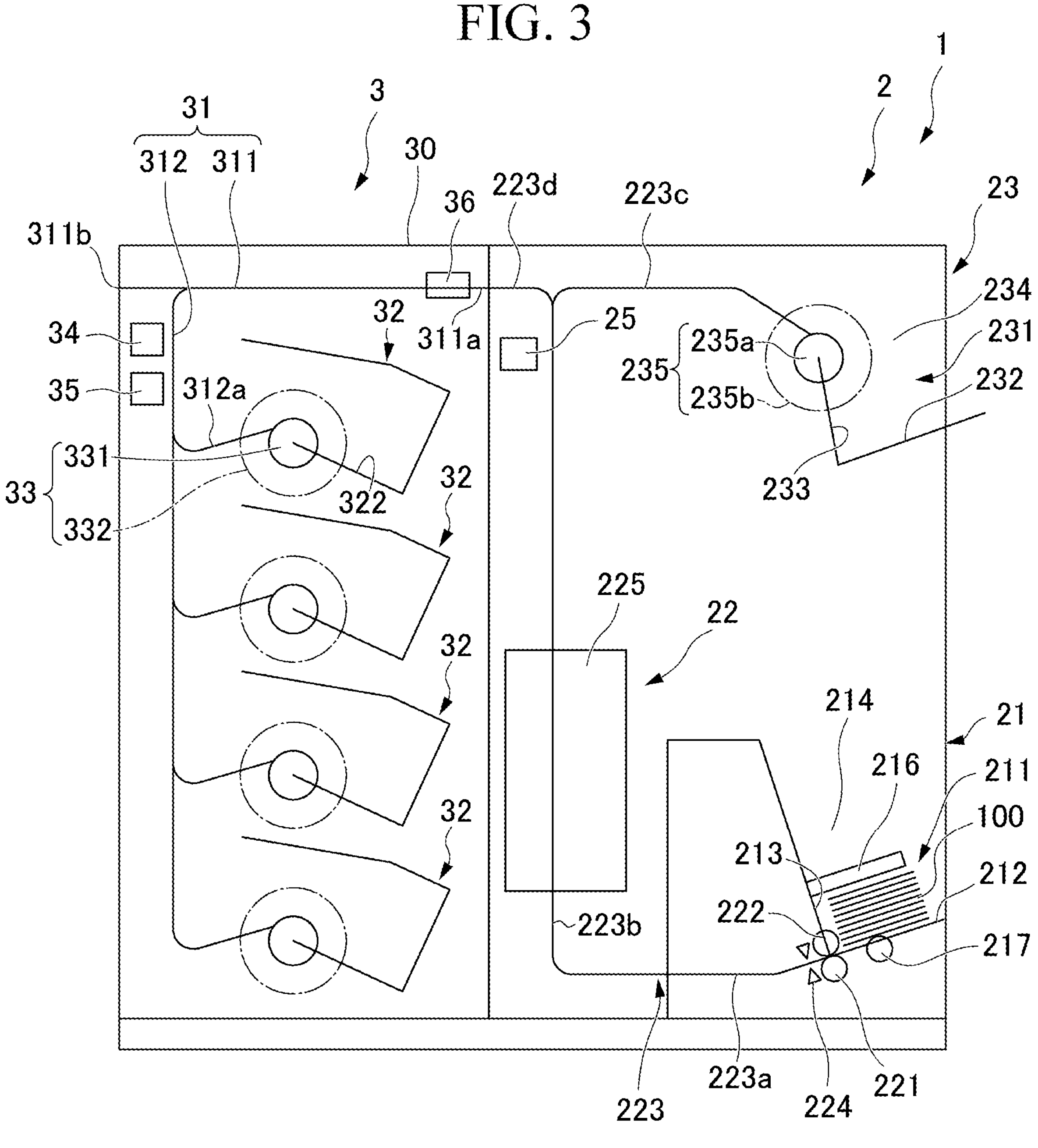
FIG. 3 is a schematic configuration diagram of the inside of the counting unit and the stacking unit of the medium processing device according to the embodiment as viewed from the front side.

FIG. 3 is a schematic cross-sectional view of the counting unit 2 and the stacking unit 3 of the medium processing device 1 according to the embodiment as viewed from the front.

Figure 4:
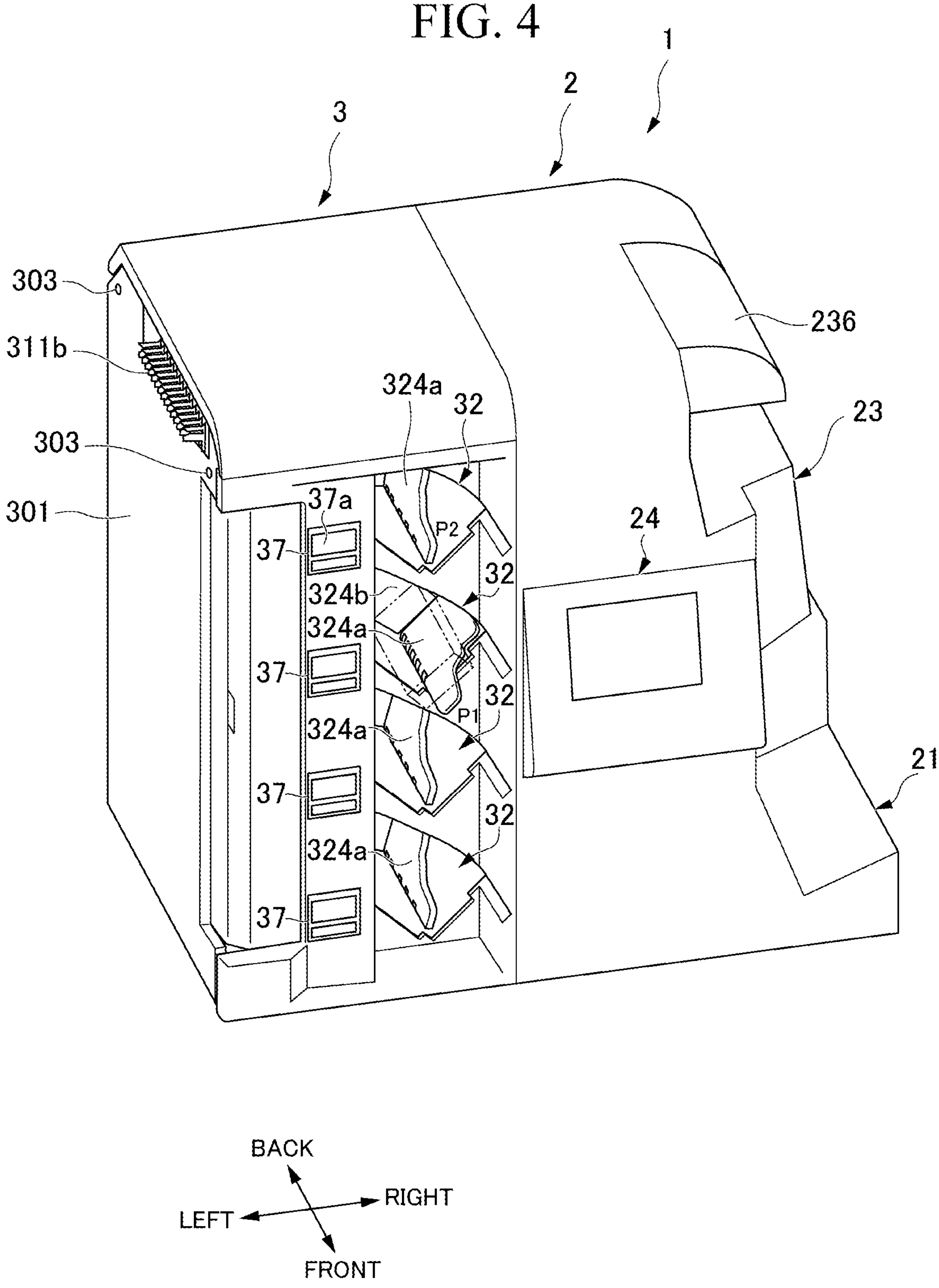
FIG. 4 is a perspective view showing a counting unit and a stacking unit of the medium processing device according to the embodiment.

FIG. 4 is a perspective view of the counting unit 2 and the stacking unit 3 as viewed from the stacking unit 3 side.

Figure 5:
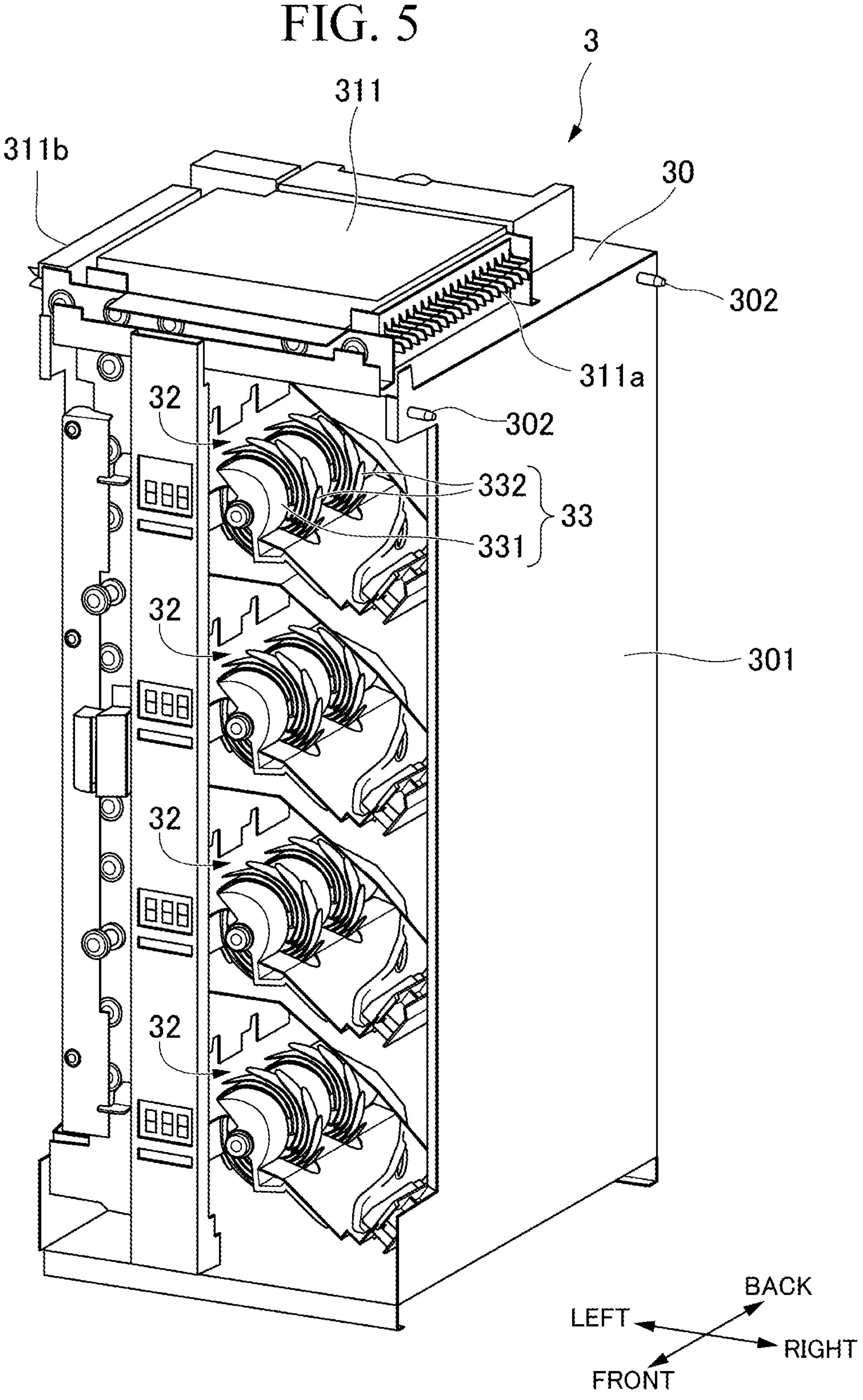
FIG. 5 is a perspective view showing a stacking unit main body of the medium processing device according to the embodiment.

FIG. 5 is a perspective view of the stacking unit 3 as seen from the counting unit 2 side, and shows a state in which the cover is removed.

Figure 6:
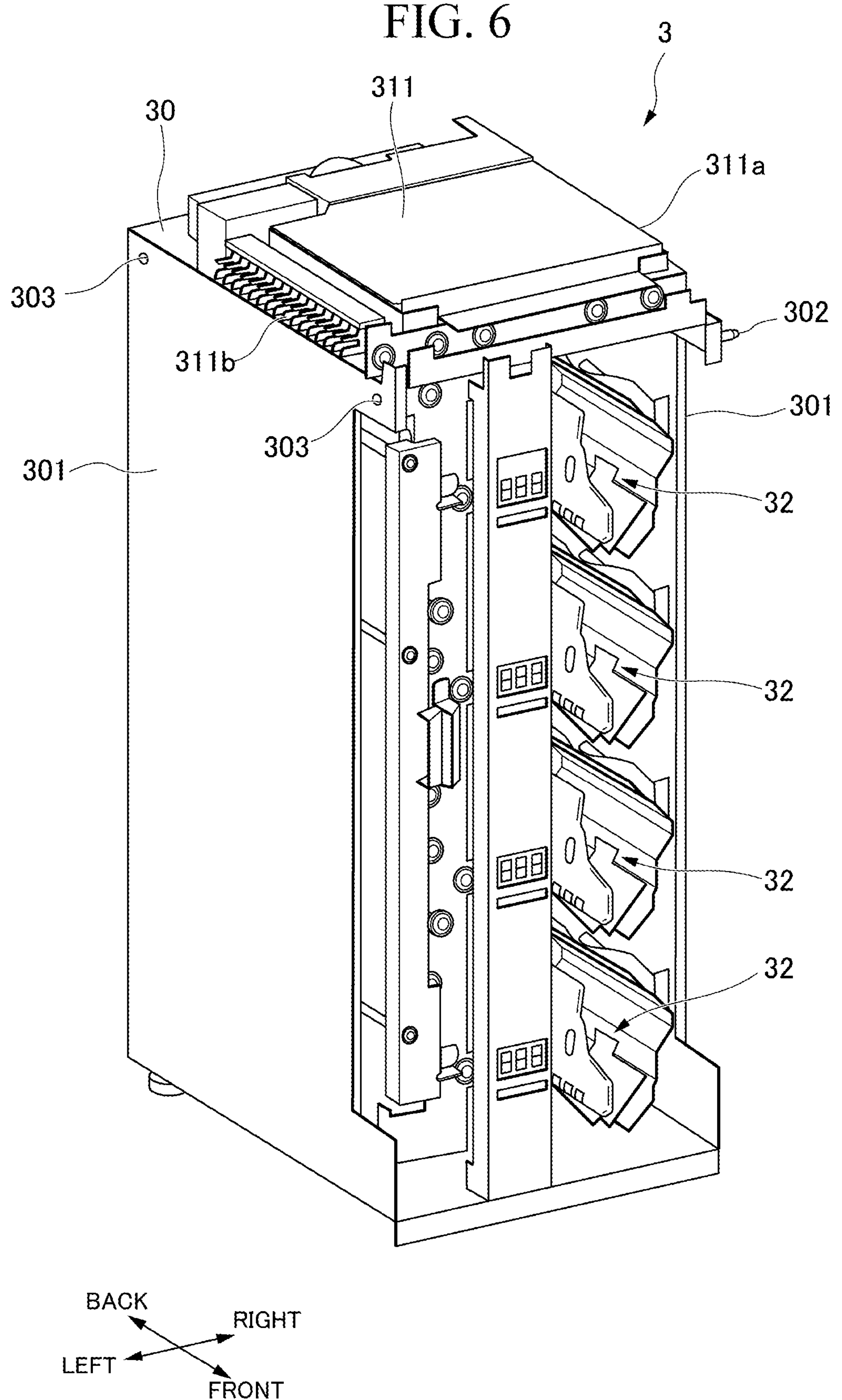
FIG. 6 is a perspective view showing a stacking unit main body of the medium processing device according to the embodiment.

FIG. 6 is a perspective view of the stacking unit 3 as seen from the stacking unit 4 side, and shows a state in which the cover is removed.

The medium processing device 1 is a device configured by combining units having one or a plurality of functions. One or more functions include, for example, a function of classifying media such as paper sheets and coins by type (for example, by denomination) and stacking in predetermined numbers set in advance, and a function of sealing every predetermined number of a medium such as paper sheets and coins that have been stacked. In the medium processing device 1, a desired series of functions can be exhibited by connecting one or a plurality of units (for example, stacking units 3 to 6 or a sealing unit (not shown)) to the counting unit 2, which is the device main body. A unit having one or more functions connected to the counting unit 2 is also called an expansion unit.

In the medium processing device 1, the counting unit 2 controls the operation of expansion units (in the embodiment, the stacking units 3 to 6). In the control system of the medium processing device 1, the counting unit 2 is located on the upper side and the expansion unit is located on the lower side. In this medium processing device 1, an operator (not shown) operates an operation display portion 24 (display device, see FIG. 2) provided in the counting unit 2 to instruct an operation, whereby a predetermined operation is performed in response to the operation instruction.

As the medium processing device 1 according to the embodiment, a case where four stacking units 3 to 6 having different numbers of stacking portions are connected to the counting unit 2 will be described as an example. The medium processing device 1 has a function of classifying paper sheets 100 such as banknotes, securities, and gold tickets charged into a receiving portion 21 of the counting unit 2 according to the type (for example, denomination) of each paper sheet 100, and stacking the paper sheets in predetermined numbers in each of the stacking portions 32, 42, 52, and 62 of the stacking units 3 to 6 in which stacking locations are set in advance for each type of paper sheet 100.

In the following description, the operation display portion 24 side (front side of the paper surface in FIG. 1) of the medium processing device 1 is defined as the front surface, and the opposite side of the operation display portion 24 of the medium processing device 1 (the back side of the paper surface in FIG. 1) is defined as the back surface or rear surface. Further, when the medium processing device 1 is viewed from the front, the counting unit 2 side is defined as on the right side (the right side of the paper surface in FIG. 1), and when the medium processing device 1 is viewed from the front, the plurality of stacking units 3 to 6 are defined as on the left side (the left side of the paper surface in FIG. 1). Further, a reject portion 23 side (upper side of the paper surface in FIG. 1) is defined as the upper side when the medium processing device 1 is viewed from the front, and the receiving portion 21 side (lower side of the paper surface in FIG. 1) is defined as the lower side when the medium processing device 1 is viewed from the front. Further, in the medium processing device 1, in the conveying direction in which the paper sheets 100 charged into the receiving portion 21 of the counting unit 2 are conveyed to the stacking units 3 to 6, the receiving portion 21 side is defined as the upstream side, while the stacking portion 32, 42, 52, 62 side is defined as the downstream side.

<Counting Unit>

First, the counting unit 2 of the medium processing device 1 will be described.

As shown in FIGS. 1 and 2, the counting unit 2 includes the receiving portion 21, a counting main body 22, the reject portion 23, an operation display portion 24 (see FIG. 2), and a control portion 25. The unprocessed paper sheets 100 are charged into the receiving portion 21. The counting main body 22 identifies and conveys the charged paper sheets 100. Rejected paper sheets are stacked in the reject portion 23. The operation display portion 24 is used for operating the medium processing device 1. The control portion 25 controls the entire medium processing device 1. In the embodiment, the paper sheets 100 charged into the receiving portion 21 are banknotes having a rectangular shape in a plan view, for example, a 10,000 yen bill, a 5,000 yen bill, a 2,000 yen bill, a 1,000 yen bill, or the like.

As shown in FIG. 3, the receiving portion 21 is provided in the lower right region of the counting unit 2 when viewed from the front. The receiving portion 21 has an opening portion 211, a bottom wall 212, a side wall 213, a back wall 214, a front wall 215 (see FIG. 2), a bill press 216, and a kick-out roller 217. The opening portion 211 is always open across the front surface and right surface at the lower right side of the counting unit 2. The paper sheets 100 are placed on the bottom wall 212. The side wall 213 is provided along the left edge of the bottom wall 212 and is provided vertically upward with respect to the bottom wall 212. The back wall 214 is provided on the back side of the receiving portion 21 and covers at least the entire back surface of the opening portion 211. The front wall 215 is provided on the front surface side facing the back wall 214. The bill press 216 presses the paper sheets 100 placed on the bottom wall 212 from the upper side toward the bottom wall 212 side. The kick-out roller 217 is provided below the bottom wall 212. A receiving space for storing the charged paper sheets 100 is formed by the bottom wall 212, the side wall 213, the back wall 214, and the front wall 215 described above.

The bottom wall 212 is a flat surface. The paper sheets 100 are placed in a state where one surface of the paper sheets 100 is in contact with the flat surface of the bottom wall 212. The bottom wall 212 is provided so as to be inclined to the upper right side with respect to the horizontal plane when viewed from the front. The plurality of paper sheets 100 placed on the bottom wall 212 are offset to the left along the inclination of the bottom wall 212. As a result, the plurality of paper sheets 100 placed on the bottom wall 212 are stacked in the receiving space in a state of a long side portion of each paper sheet 100 abutting the side wall provided along the left edge of the bottom wall 212 whereby the positions are aligned in the width direction.

The distance between the back wall 214 and the front wall 215 is set to be slightly longer than the length in the longitudinal direction of the paper sheets 100. Therefore, at least either one of both short sides of the plurality of paper sheets 100 placed on the bottom wall 212 abuts either the back wall 214 or the front wall 215, whereby the paper sheets 100 are stacked in the receiving space in a state of the positions thereof in the longitudinal direction being substantially aligned by the back wall 214 and the front wall 215.

In the side wall 213, a through hole (not shown) penetrating the side wall 213 in the thickness direction is provided in the vicinity of the bottom wall 212. This through hole (not shown) is provided along the edge of the bottom wall 212 side of the side wall 213, and is longer than the long side portion of the paper sheet 100. Therefore, after being separated one by one from the bottom layer in the stacked state by the kick-out roller 217 (see FIG. 3) provided in the lower side of the bottom wall 212, the paper sheets 100 stacked on the bottom wall 212 are conveyed to the counting main body 22 side by passing through the through hole (not illustrated) of the side wall 213.

The plurality of paper sheets 100 are conveyed one by one from the through hole (not shown) provided in the side wall 213 to the counting main body 22 side in a state where the long side portion is in contact with the side wall 213. Therefore, the plurality of paper sheets 100 are conveyed in the medium processing device 1 with the width direction being the conveying direction.

The bill press 216 is provided so as to be movable in the vertical direction along the side wall 213.

The bill press 216 presses the paper sheets 100 from the upper side to the lower side with a force corresponding to the number of paper sheets 100 stacked in the receiving space (thickness of the paper sheets 100 in the stacked state). Thereby, in the receiving portion 21, at least the paper sheet at the lowest layer of the stacked paper sheets 100 is in close contact with the bottom wall 212, and so separation of the paper sheets 100 can be accurately performed by the kick-out roller 217.

As shown in FIG. 3, the counting main body 22 includes a take-in roller 221, a separation roller 222, an endo-counting unit conveying mechanism 223, a detection portion 224, and an identifying portion 225. The take-in roller 221 takes in the paper sheets 100 conveyed from the receiving portion 21 (receiving space) into the counting main body 22. The separation roller 222 separates the paper sheets 100 taken in by the take-in roller 221 one by one. The conveying mechanism 223 in the counting unit conveys the taken-in paper sheets 100. The detection portion 224 performs detection of the taken-in paper sheets 100 and the taken-in state. The identifying portion 225 identifies the authenticity of the taken-in paper sheets 100 and the like. An identification device is composed of the detection portion 224 and the identifying portion 225.

The take-in roller 221 and the separation roller 222 are provided in the vicinity of the downstream side of the through hole (not shown) of the side wall 213. The take-in roller 221 and the separation roller 22 are arranged so as to face each other in the thickness direction of the paper sheets 100. The paper sheets 100 are sandwiched between the take-in roller 221 and the separation roller 222, to be delivered one by one to the endo-counting unit conveying mechanism 223 by the rotation of these rollers 221 and 222.

The endo-counting unit conveying mechanism 223 has a take-in conveyance path **223*a*, an identification conveyance path 223*b*, a reject side conveyance path 223*c*, and a carry-out side conveyance path 223*d*. The take-in conveyance path 223*a* conveys the paper sheets 100 taken in from the receiving portion 21 into the counting main body 22. The identification conveyance path 223*b* is connected to the end portion of the take-in conveyance path 223*a* opposite to the receiving portion 21. The reject side conveyance path 223*c* is connected to the opposite end of the take-in conveyance path 223*a* in the identification conveyance path 223*b*. The carry-out side conveyance path 223*d* is an end portion of the identification conveyance path 223*b* and is connected to the same end portion as the end portion to which the reject side conveyance path 223*c*** is connected.

The take-in conveyance path **223*a* is coupled to a through hole (not shown) of the side wall 213 in the receiving portion 21, and is provided extending from the receiving portion 21 side to the left side. The detection portion 224 is provided on the downstream side of the take-in roller 221 and the separation roller 222 in the take-in conveyance path 223*a***.

The detection portion 224 detects whether or not the paper sheets 100 have been taken into the counting main body 22 and detects the conveyance state of the taken-in paper sheets 100. The detection portion 224 detects the presence or absence of double feeding from the light transmittance or the physical thickness of the conveyed paper sheets 100. Double feeding means a state in which at least a part of two or more paper sheets 100 are overlapped. The detection portion 224 also detects the presence or absence of skew from the deviation of the detection timing of each of both ends in the longitudinal direction of the paper sheets 100 being conveyed. Skew means that the paper sheets 100 are conveyed in a state where the short side portion of the paper sheets 100 is inclined with respect to the conveying direction. Moreover, the detection portion 224 detects the presence or absence of near feed of the paper sheets 100 from the interval of each detection timing of the paper sheets 100 adjacent to each other in the conveying direction. In this way, the counting main body 22 can detect double feed, skew, and near feed of the paper sheets 100 by the detection portion 224, and determine whether or not the paper sheets 100 are normally conveyed.

The identification conveyance path 223*b* extends substantially perpendicular to the take-in conveyance path 223*a* from the end on the opposite side of the receiving portion 21 in the take-in conveyance path 223*a*. The identifying portion 225 is provided at an intermediate position of this identification conveyance path 223*b*.

The identifying portion 225 has an optical sensor (not shown) and an imaging device (not shown). The optical sensor has a plurality of light emitting elements that emit light having different wavelengths and a light receiving element that receives the light emitted from these light emitting elements. The image pickup device acquires the image information of the paper sheet 100 when the paper sheet 100 conveyed along the identification conveyance path 223*b* is irradiated with light of a predetermined frequency from the light emitting element.

The identifying portion 225 emits visible light and ultraviolet rays from a plurality of light emitting elements at the paper sheets 100 conveyed along the identification conveyance path 223*b*. The identifying portion 225 acquires by an imaging device image information of the paper sheets 100 at the time of irradiation with visible light and the time of irradiation with ultraviolet rays. The identifying portion 225 compares this acquired image information with reference image data created in advance for each type of the paper sheet 100, and specifies the type of reference image data that can be determined to match as the type (denomination) of the paper sheet 100.

The paper sheet whose type (denomination) is specified by the existence of the reference image data that matches in this way is specified as the paper sheet 100 with no identification abnormality. The paper sheets 100 with no identification abnormality are conveyed to the carry-out side conveyance path 223*d*, which will be described later, to be delivered to a common conveyance path 311 of the stacking unit 3. On the other hand, a paper sheet whose type cannot be specified because there is no matching reference image data is specified as a paper sheet 100 having an identification abnormality. The paper sheets 100 having the identification abnormality become the rejected paper sheets that are conveyed to the reject side conveyance path 223*c* to be stored in the reject portion 23.

The reject side conveyance path 223*c* extends from the branch portion provided at the other end of the identification conveyance path 223*b* to the vicinity of the reject portion 23.

The reject portion 23 is provided in the upper right area of the counting unit 2 when viewed from the front. The reject portion 23 has an opening portion 231, a bottom wall 232, a side wall 233, a back wall 234, and an impeller 235. The opening portion 231 is always open across the front surface and the right side surface on the upper right side of the counting unit 2. The paper sheets 100 are placed on the bottom wall 232. The side wall 233 is provided along the left edge of the bottom wall 232 and is provided vertically upward with respect to the bottom wall 232. The back wall 234 is provided on the back side of the reject portion 23 and covers at least the entire back surface of the opening portion 231. The bottom wall 232, the side wall 233, and the back wall 234 described above form a reject space for storing rejected paper sheets.

The bottom wall 232 is a flat surface. The rejected paper sheets are placed in a state where one surface of the rejected paper sheets is in contact with the flat surface of the bottom wall 232. The bottom wall 232 is provided so as to be inclined to the upper right side with respect to the horizontal plane when viewed from the front. The plurality of rejected paper sheets placed on the bottom wall 232 are offset to the left. As a result, the plurality of rejected paper sheets are stacked in the reject space in a state of a long side portion of each paper sheet 100 abutting the side wall 233 provided along the left edge of the bottom wall 232 whereby the positions are aligned in the width direction.

The impeller 235 is provided on the upper side of the bottom wall 232 and near the end of the reject side conveyance path 223*c*. The impeller 235 includes a rotating body 235*a* rotatably provided around the rotation axis and a plurality of blade bodies 235*b* provided at equal intervals over the entire circumference of the rotating body 235*a* in the circumferential direction.

Each blade body 235*b* is curved in the same direction along the circumferential direction around the rotation axis of the rotating body 235*a* from the base end portion on the rotating body 235*a* side to the outer tip portion. In the embodiment, each blade body 235*b* is curved counterclockwise along the circumferential direction around the rotation axis of the rotating body 235*a*. As a result, the rejected paper sheets conveyed one by one along the reject side conveyance path 223*c* are delivered one by one between mutually adjacent blade 235*b* and blade 235*b* of the impeller 235, and thereby conveyed while rotating to the reject space side.

When the rejected paper sheets accommodated between the mutually adjacent blade 235*b* and the blade 235*b* abut the side wall 233 and are fed out from between the blade 235*b* and the blade 235*b*, they are sequentially placed on the bottom wall 232 while being pushed toward the bottom wall 232 side by the rearward blade body 235*b* in the rotation direction. That is, the rejected paper sheets are judged as being rejected paper sheets and so fed out to the reject portion 23 to be stacked in order from bottom to top, in the order in which they were taken into the counting main body 22 from the receiving portion 21.

The reject portion 23 has a reject paper sheet detection sensor (not shown) that detects the presence or absence of rejected paper sheets stacked in the reject space, and a reject paper sheet notification portion (not shown) in which the lighting state is switched on the basis of the detection result of this reject paper sheet detection sensor.

The reject paper sheet detection sensor (not shown) is a sensor provided so as to be able to detect the presence/absence of rejected paper sheets and the stacking state in the reject space of the reject portion 23. As this sensor, various sensors such as an optical sensor, a magnetic sensor, and a capacitance sensor can be used. Either a transmissive sensor or a reflective sensor may be used as the optical sensor, which can detect the presence/absence and stacking state of rejected paper sheets in the reject space by detecting, with a light receiving element, the light receiving level of light emitted from the light emitting element. The magnetic sensor can detect the presence/absence and the stacking state of rejected paper sheets in the reject space by measuring the change in the magnetic flux generated in the reject space. The capacitance sensor can detect the presence/absence and the stacking state of rejected paper sheets in the reject space by measuring the change in the capacitance in the reject space.

The reject paper sheet notification portion (not shown) has a light emitting element such as an LED (Light Emitting Diode). The reject paper sheet notification portion changes the notification mode on the basis of the detection result of rejected paper sheets in the reject space detected by the reject paper sheet detection sensor. For example, the reject paper sheet notification portion may turn on the LED when it is detected by the reject paper sheet detection sensor that a rejected paper sheet is present in the reject space. The reject paper sheet notification portion may turn off the LED when it is detected by the reject paper sheet detection sensor that there is no rejected paper sheet in the reject space. Further, the reject paper sheet notification portion may blink the LED when the rejected paper sheets stacked in the reject space are in the full state.

It is preferable that the reject paper sheet notification portion (not shown) described above be provided at a position easily visible by the operator. For example, the bottom wall 232 of the reject portion 23 may be formed of a transparent or translucent synthetic resin material or the like, and the above-mentioned LED may be provided under the transparent or translucent bottom wall 232. As a result, the light emitted from the LED of the reject paper sheet notification portion illuminates the entire transparent or translucent bottom wall 232 and becomes visible to the operator (not shown) through the opening portion 231. Examples of the transparent or translucent synthetic resin material described above include an acrylic resin, a polycarbonate resin, a polyethylene terephthalate (PET) resin, and the like.

The reject paper sheet notification portion (not shown) may be provided in a cover 236 (see FIG. 2) that covers the upper side of the reject portion 23. In this case as well, by forming the cover 236 with a transparent acrylic resin or the like, the light emitted from the LED of the reject paper sheet notification portion illuminates the entire transparent cover 236, and since the cover 236 is arranged at a height position closer to the line of sight of the operator (not shown), it is easily viewable by the operator (not shown).

The carry-out side conveyance path 223*d* that branches from the branch portion of the identification conveyance path 223*b* and extends to the left side is connected to an endo-stacking unit conveying mechanism 31 of the stacking unit 3.

The counting unit 2 has a control portion 25. The control portion 25 includes an arithmetic logic unit such as a CPU (Central Processing Unit) and a storage device such as a ROM (Read Only Memory) and a RAM (Random Access Memory). The ROM stores a control program for controlling the counting unit 2 and the stacking units 3 to 6, and reference image data (master data) that serves as a reference for identification by the identifying portion 225 described above, and the like. The RAM stores data and the like of the identification and counting result. The control portion 25 implements each function for controlling the counting unit 2 and the stacking units 3 to 6 by loading the control program stored in the ROM.

<Stacking Unit>

Next, the stacking unit 3 connected to the counting unit 2 will be described.

As shown in FIG. 3, the stacking unit 3 includes a stacking main body portion 30, the endo-stacking unit conveying mechanism 31, the stacking portion 32, an impeller 33, a control portion 34, a storage portion 35, an optical sensor 36, and a status display portion 37 (see FIG. 2).

The control portion 34 and the storage portion 35 are housed inside the stacking main body portion 30. The control portion 34 is an arithmetic computation unit such as a CPU, and controls the entire stacking unit 3 by executing a control program stored in the storage portion 35. The storage portion 35 is a storage device such as a ROM or RAM. In the storage portion 35, in addition to the control program for performing the overall control of the stacking unit 3, the calculation result by the control portion 34 and the like are temporarily stored. Further, type information (see FIG. 9) for distinguishing the type of the stacking unit 3 (for example, types such as the stacking unit and the sealing unit) and identification information for identifying the stacking unit 3 (the unique ID of the CPU or the unique ID of the communication device: see FIG. 18) are stored in advance in the storage portion 35.

As shown in FIG. 5, the stacking main body portion 30 is a tubular member having a substantially rectangular parallelepiped shape. Partition walls 301 and 301 for partitioning with other units are provided on the counting unit 2 side (right side) and the other stacking units 4 to 6 side (left side) of the stacking main body portion 30, respectively.

Two unit coupling pins 302 and 302 are provided on the upper side of the partition wall 301 on the counting unit 2 side of the counting main body portion 30. The two unit coupling pins 302 and 302 are provided at the same height position and are spaced apart in the front-rear direction. The unit coupling pins 302 and 302 fit into unit coupling holes (not shown) provided at corresponding positions in the partition wall (not shown) on the stacking unit side of the counting unit 2, or coupling holes 303 (see FIG. 6) provided at the corresponding positions of the partition wall in another stacking unit. Thereby, the counting unit 2 and each of the stacking units 3 to 6 are positioned and integrally coupled in a state of the positions thereof in the vertical direction and the left-right direction being matched.

Returning to FIG. 3, the endo-stacking unit conveying mechanism 31 has the common conveyance path 311 and a branch conveyance path 312. The common conveyance path 311 and the branch conveyance path 312 are driven independently by separate drive motors.

The common conveyance path 311 is provided on the upper side of the stacking main body portion 30 and extends in the horizontal direction (left-right direction). A conveyance inlet portion 311*a* (see FIG. 5) is provided on the counting unit 2 side of the common conveyance path 311. The conveyance inlet portion 311*a* is continuously connected to the carry-out side conveyance path 223*d* of the counting unit 2 in a state in which the counting unit 2 is connected to the stacking unit 3. Therefore, the common conveyance path 311 of the stacking unit 3 and the carry-out side conveyance path 223*d* of the counting unit 2 are integrally coupled, and the paper sheets 100 conveyed from the carry-out side conveyance path 223*d* of the counting unit 2 are delivered to the common conveyance path 311 of the stacking unit 3.

As shown in FIG. 3, in the common conveyance path 311, an optical sensor 36 for detecting the paper sheets 100 is provided on the downstream side of the conveyance inlet portion 311*a*. The optical sensor 36 is arranged at a position where the paper sheets 100 conveyed along the common conveyance path 311 can be detected. When the optical sensor 36 detects the paper sheets 100 conveyed along the common conveyance path 311, the optical sensor 36 generates a signal indicating that the paper sheets 100 have been detected and transmits the signal to the control portion 25 of the counting unit 2.

A conveyance outlet 311*b* (see FIG. 6) is provided on the opposite side (stacking unit 4 side) of the common conveyance path 311 from the counting unit 2. The conveyance outlet portion 311*b* is continuously connected to a conveyance inlet portion 411*a* of a common conveyance path 411 in the stacking unit 4 in a state where the stacking unit 4 is connected to the side opposite to the counting unit 2 of the stacking unit 3. Therefore, the common conveyance path 311 of the stacking unit 3 and the common conveyance path 411 of the stacking unit 4 are integrally coupled, and the paper sheets 100 conveyed from the common conveyance path 311 of the stacking unit 3 are delivered to the common conveyance path 411 of the stacking unit 4.

Returning to FIG. 3, a branch conveyance path 312 is provided on the conveyance outlet portion 311*b* side of the common conveyance path 311. The branch conveyance path 312 extends in a direction different from the horizontal direction in which the common conveyance path 311 extends.

The branch conveyance path 312 extends from the common conveyance path 311 in the downward direction perpendicular to the common conveyance path 311. By switching the conveyance path of the paper sheets 100 conveyed along the common conveyance path 311 to the branch conveyance path 312, the paper sheets 100 are conveyed along the branch conveyance path 312 in a downward direction perpendicular to the common conveyance path 311, which is a direction different from the horizontal direction. Switching between conveying the paper sheets 100 conveyed on the common conveyance path 311 to the common conveyance path 411 of the stacking unit 4 coupled to the stacking unit 3 or to the branch conveyance path 312 is performed by a conveyance sorting mechanism (not shown). A selection is made by this conveyance sorting mechanism (not shown) whether to convey the paper sheets 100 to the common conveyance path 411 of the stacking unit 4 or to convey the paper sheets 100 to the branch conveyance path 312 side, whereby the conveyance direction of the paper sheets 100 is switched.

A plurality of horizontal conveyance paths 312*a* connected to each of a plurality of intermediate positions of the branch conveyance path 312 are provided. Each horizontal conveyance path 312*a* extends substantially horizontally. In the embodiment, the four horizontal conveyance paths 312*a* are connected to the branch conveyance path 312 at four intermediate positions at substantially equal intervals. Each horizontal conveyance path 312*a* extends to the vicinity of the corresponding stacking portion 32. The selection of which horizontal conveyance path 312*a* to distribute the paper sheets 100 from the branch conveyance path 312 and the sorting is performed by a conveyance sorting mechanism (not shown) similar to the conveyance sorting mechanism described above.

An impeller 33 is provided at the end of each horizontal conveyance path 312*a* on the stacking portion 32 side. The impeller 33 is rotatably provided around a rotation axis provided near the end of the horizontal conveyance path 312*a*. The impeller 33 has the same configuration as the impeller 235 described above. The impeller 33 includes a rotating body 331 rotatably provided around the rotation axis and a plurality of blade bodies 332 provided at equal intervals over the entire circumference of the rotating body 331 in the circumferential direction.

Each blade body 332 is curved in the same direction along the circumferential direction around the rotation axis of the rotating body 331 from the base end portion on the rotating body 331 side to the outer tip portion. In the embodiment, each blade body 332 is curved counterclockwise along the circumferential direction around the rotation axis of the rotating body 331. As a result, the paper sheets 100 conveyed along the horizontal conveyance path 312*a* are delivered one by one between the mutually adjacent blade body 332 and the blade body 332 of the impeller 33, and thereby conveyed while rotating to the stacking portion 32 side.

The paper sheets 100 accommodated between the mutually adjacent blade body 332 and the blade body 332 abut an accommodation bottom wall 322 of the stacking portion 32, which will be described later, are fed out from between the blade body 332 and the blade body 332, and then sequentially stacked in the stacking portion 32 while being pushed toward the accommodation bottom wall 322 side by the rearward blade body 332 in the rotation direction.

As shown in FIG. 2, a plurality of stacking portions 32 are arranged in the vertical direction of the stacking main body portion 30 in the stacking unit 3. In the stacking unit 3 of the embodiment, four stacking portions 32 are arranged at substantially equal intervals in the vertical direction of the stacking main body portion 30. Since each of the stacking portions 32 has the same configuration, one stacking portion 32 of the four stacking portions 32 will be described in the present specification.

The stacking portion 32 includes an opening portion 321 that is always open on the front side, the accommodation bottom wall 322, an accommodation back wall 323 that covers at least the back side of the opening portion 321, and a sliding stage 324 on which the paper sheets 100 are placed. The accommodation bottom wall 322, the accommodation back wall 323, and the sliding stage 324 of the stacking portion 32 form a stacking space for stacking and accommodating a plurality of the paper sheets 100.

The accommodation bottom wall 322 of the stacking portion 32 is a flat surface. The paper sheets 100 are stacked in a state where a long side portion of each of the paper sheets 100, which are paid out one by one from the impeller 33, is in contact with the flat surface of the stacking portion 32. The flat surface of the accommodation bottom wall 322 is inclined to the lower right side with respect to the horizontal plane. Therefore, the plurality of paper sheets 100 placed on the accommodation bottom wall 322 are offset to the left side in the state of a long side portion thereof being abutted against the accommodation bottom wall 322, and one surface abutting the sliding stage 324 (the movable wall 324*a* described later). Therefore, the paper sheets 100 are stacked in the stacking space in a state of the positions thereof in the width direction being aligned.

The sliding stage 324 includes the movable wall 324*a* against which one surface of each of the paper sheets 100 abuts, and a slide mechanism 324*b* (see FIG. 4) that slides this movable wall 324*a* in the front direction and the back direction of the stacking main body portion 30.

The movable wall 324*a* is provided along the right edge of the accommodation bottom wall 322, and is provided to be rotatable in a predetermined angle range with an axis provided along the right edge of the accommodation bottom wall 322 serving as the rotation axis. In the embodiment, the movable wall 324*a* is provided to be rotatably movable between an extraction position P1 (position of the movable wall 324*a* in the second stage from the top of FIG. 2) located in a substantially perpendicular state with respect to the accommodation bottom wall 322, and a stacking position P2

(the position of the movable wall 324*a* at the uppermost stacking portion 32 in FIG. 2) which is rotated by a predetermined angle in the direction (counterclockwise) closer to the accommodation bottom wall 322 than the extraction position P1.

When the movable wall 324*a* is at the stacking position P2, the movable wall 324*a* is in a state of being slightly tilted toward the extraction position (accommodation bottom wall 322) with respect to the vertical line. Therefore, when a plurality of paper sheets 100 are brought into contact with the movable wall 324*a* in a state of being stacked, the movable wall 324*a* is pressed toward the extraction position P1 side by the weight of the paper sheets 100.

On the other hand, the movable wall 324*a* is biased toward the stacked position P2 direction by a biasing member 324*c* (see FIG. 2) such as a spring. When the weight of the paper sheets 100 stacked on the movable wall 324*a* becomes larger than the biasing force of the spring, the movable wall 324*a* rotates in the direction of the extraction position P1 by an amount corresponding to the number of the paper sheets 100 stacked on the movable wall 324*a*. When paper sheets 100 equal to or greater than a predetermined number (for example, 300 sheets) are stacked on the movable wall 324*a*, the movable wall 324*a* rotates until the extraction position P1 and stops.

As shown in FIG. 4, the slide mechanism 324*b* has a guide (not shown) that slidably supports the movable wall 324*a* in the front direction and the back direction, and a drive motor (not shown) that slides the movable wall 324*a* in the front direction or the back direction along the guide.

In the stacking unit 3, the drive motor is driven to slide the movable wall 324*a* in the front direction along the guide, whereby it is possible to position at least a portion of the paper sheets 100 stacked on the movable wall 324*a* in the longitudinal direction on the outer side of the opening portion 321 of the stacking portion 32 (position of the movable wall 324*a* in the second-stage stacking portion 32 from the top in FIG. 4). As a result, in the stacking unit 3, the operator (not shown) can easily take out the paper sheets 100 from the stacking portion 32.

The stacking portion 32 includes a paper sheet notification unit (not shown) having the same configuration as the reject paper sheet notification unit (not shown) described above. The paper sheet notification unit performs notifications such as turning on, off, and blinking of an LED in accordance with presence/absence of paper sheets in the stacking portion 32, the amount of paper sheets (for example, a full state), and the like.

As shown in FIG. 4, in the stacking main body portion 30, a status display portion 37 corresponding to the stacking portion 32 is provided on the left side adjacent to each stacking portion 32.

The status display portion 37 has a liquid crystal display portion 37*a*, and this liquid crystal display portion 37*a* displays a status such as the number of paper sheets 100 stacked in the stacking space of the stacking portion 32.

As shown in FIG. 1, in the embodiment, the stacking units 3 to 6 are connected to the counting unit 2 in this order. The stacking unit 4 has three stacking portions 42. The stacking unit 5 has two stacking portions 52. The stacking unit 6 has one stacking portion 62. These stacking units 4 to 6 differ only in the number of the stacking portions 42, 52, 62 respectively provided in the stacking units 4 to 6, and have the same (common) functions with the same configurations as the endo-stacking unit conveying mechanism 31 and the conveyance sorting mechanism (not shown) described above, such as endo-stacking unit conveying mechanisms

41, 51, 61 and a conveyance sorting mechanism (not shown). In the stacking units 4 to 6, the same configuration as the stacking unit 3 described above will be described as necessary without detailed description.

As described above, in the medium processing device 1, different types of expansion units having various functions are connected (expansively added) to the counting unit 2 in accordance with the number of types of media and the processing content. For example, in the medium processing device 1, one or a plurality of types of stacking units and/or a sealing unit for sealing stacked paper sheets can be connected to the counting unit 2. As a result, the medium processing device 1 can flexibly respond to changes in functions (stacking, sealing, and the like) required by the user, and so it is easy to increase variations without changing the design.

As described above, in the medium processing device 1, a plurality of types of stacking units 3 to 6 having different numbers of stacking portions are connected to the counting unit 2. A connection cable is connected to a respective connection terminal in each of the stacking units 3 to 6. This connection cable is connected to a connection port provided in the counting unit 2.

Here, in the counting unit, in order to determine to which stacking portion of the target stacking unit preset for each type of paper sheet the paper sheets charged into the receiving portion should be sorted and stacked, it is necessary to set the connection order of the stacking units connected to the counting unit. Therefore, the installation worker who installs the medium processing device needs to connect the connection cable of each stacking unit to a predetermined connection port provided on the counting unit in order. However, when the number of stacking units connected to the counting unit increases, there is a risk that the installation worker will make a mistake in the connection order of the connection cables of the stacking units connected to the connection ports of the counting unit.

Therefore, in the medium processing device 1 according to the embodiment, the setting of the connection order of the stacking units 3 to 6 with respect to the counting unit 2 can be accurately performed regardless of the connection order of the connection cable of each stacking unit 3 to 6 to the connection port of the counting unit 2 by the installation worker.

<Example of Connection of Expansion Unit>

Hereinbelow, a connection example of the stacking units 3 to 6 with respect to the counting unit 2 will be described.

Figure 7:
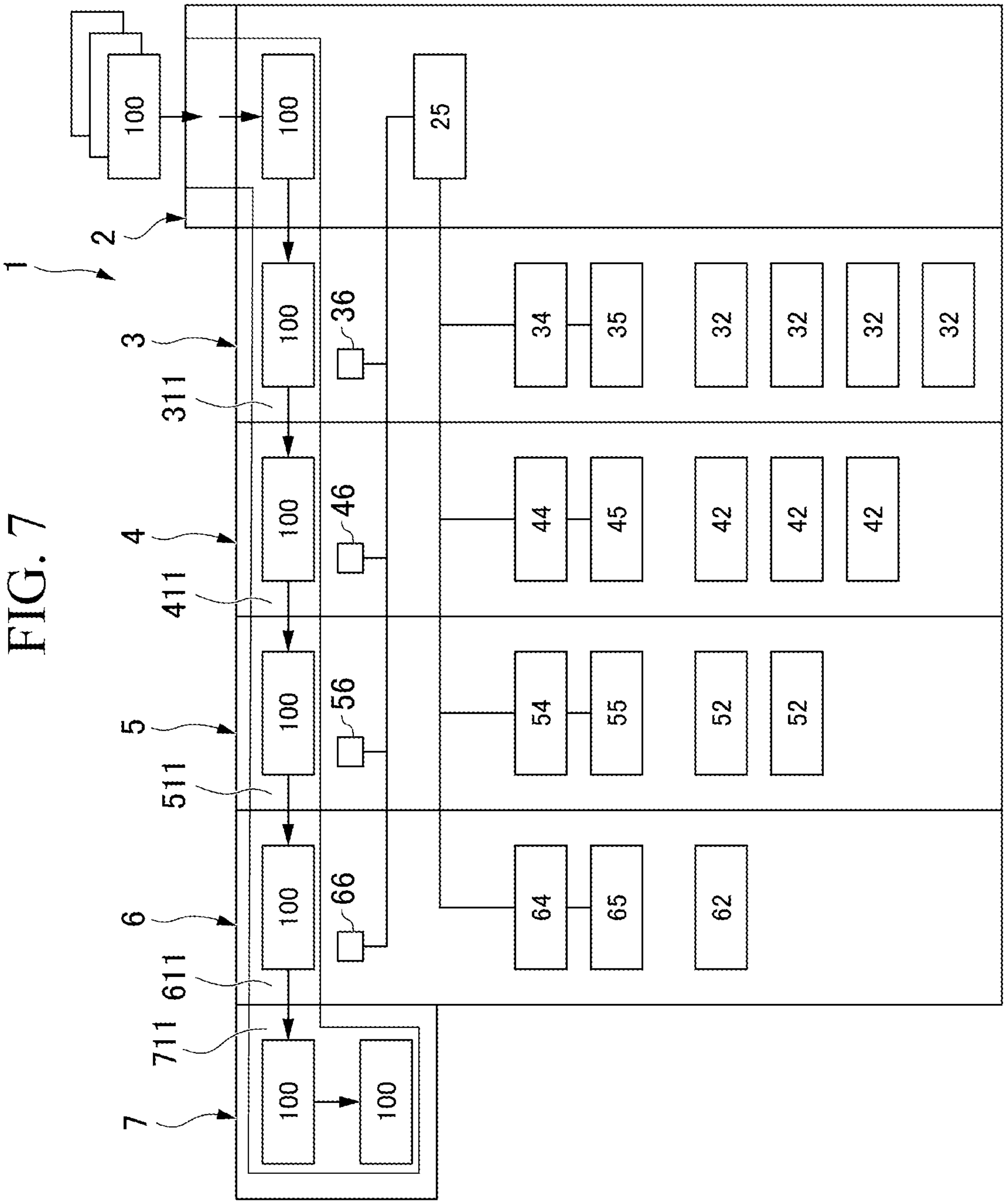
FIG. 7 is a diagram illustrating the method of setting the connection order of stacking units with respect to a counting unit of the medium processing device according to the embodiment.

FIG. 7 is a diagram illustrating a method of setting the connection order of the stacking units 3 to 6 with respect to the counting unit 2.

Figures 8, 9:
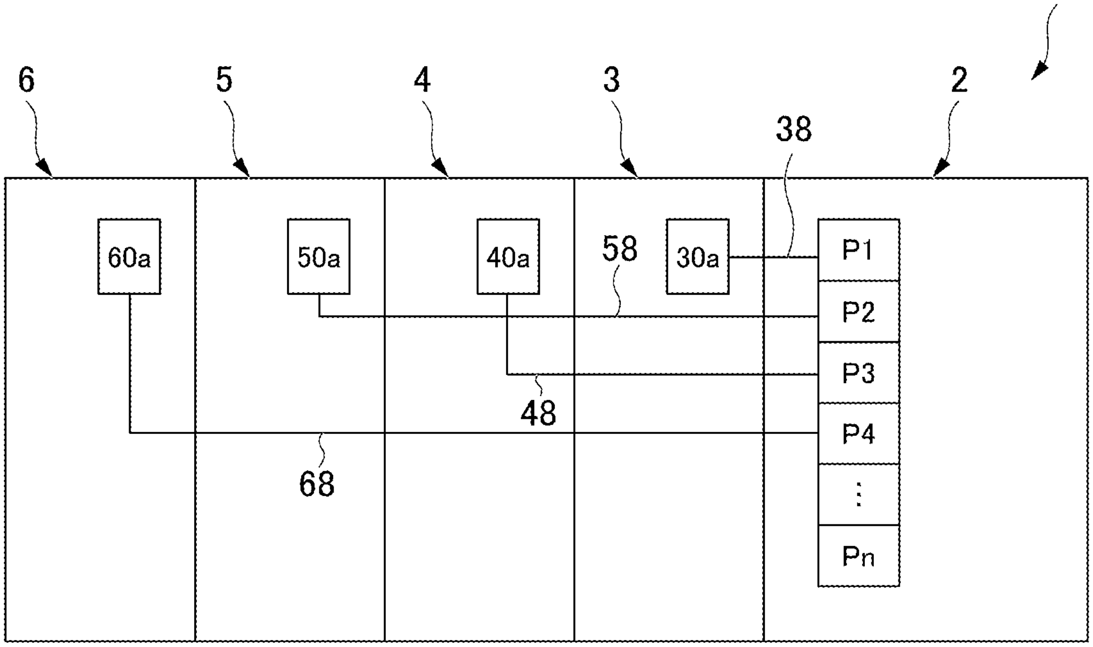
FIG. 8 is a diagram illustrating a method of setting the connection order when the counting unit and the stacking unit of the medium processing device according to the embodiment are connected in parallel.
FIG. 9 is a diagram showing an example of a connection relationship when the counting unit and the stacking unit according to the embodiment are connected in parallel.

FIG. 8 is a diagram illustrating a method of setting the connection order when the counting unit 2 and the stacking units 3 to 6 are connected in parallel.

FIG. 9 is a diagram showing an example of a connection relationship when the counting unit 2 and the stacking units 3 to 6 are connected in parallel. In the example of FIG. 9, the connection relationship by the cables between the counting portion 2 and each of the stacking units 3 to 6 is parallel.

Figure 10:
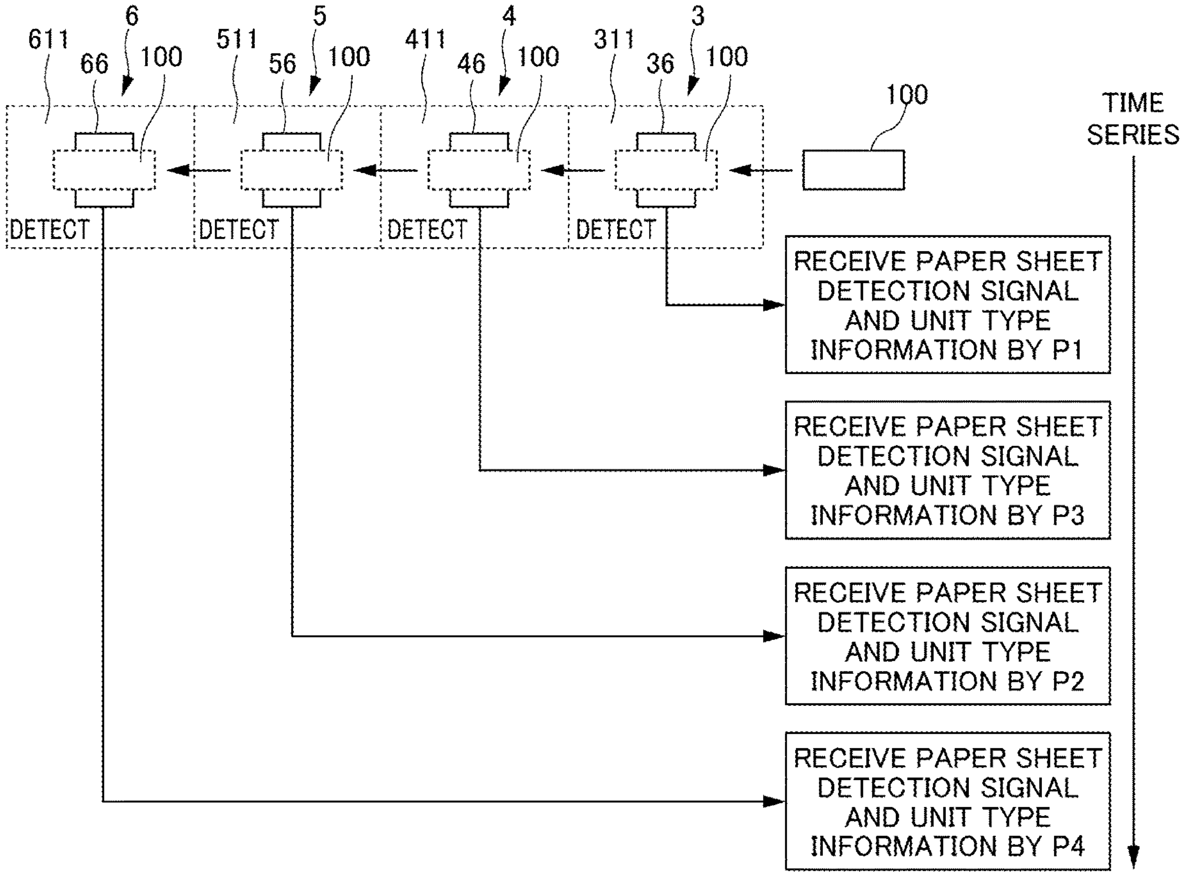
FIG. 10 is a diagram illustrating an example of a reception status, in the counting unit, of the reception signal generated by each stacking unit when the counting unit and the stacking unit of the medium processing device according to the embodiment are connected in parallel.

FIG. 10 is a diagram illustrating an example of the reception status of the reception signal generated by each of the stacking units 3 to 6 in the counting unit 2 when the counting unit 2 and the stacking units 3 to 6 are connected in parallel.

As shown in FIG. 8, in the medium processing device 1 according to the embodiment, four different types of stacking units 3, 4, 5, and 6 are coupled to the counting unit 2 in this order. Connection ports 30*a*, 40*a*, 50*a*, 60*a* respectively provided in the stacking units 3 to 6 and connection ports P1 to Pn provided in the counting unit 2 are connected by connection cables 38, 48, 58, 68. Therefore, the stacking units 3 to 6 and the counting unit 2 are connected in parallel by the connection cables 38, 48, 58, 68. Information is transmitted and received via these connection cables. In the medium processing device 1, the number of connection ports P1 to Pn provided in the counting unit 2 is the maximum number of stacking units that can be connected to one counting unit 2.

In the examples shown in FIGS. 8 and 9, the connection cable 38 is connected to the connection port 30*a* of the stacking unit 3 and the connection port P1 of the counting unit 2. The connection cable 48 is connected to the connection port 40*a* of the stacking unit 4 having the three stacking portions 42 and the connection port P3 of the counting unit 2. The connection cable 58 is connected to the connection port 50*a* of the stacking unit 5 having the two stacking portions 52 and the connection port P2 of the counting unit 2. The connection cable 68 is connected to the connection port 60*a* of the stacking unit 6 having one stacking portion 62 and the connection port P4 of the counting unit 2.

As shown in FIGS. 7 and 10, when the paper sheets 100 are conveyed along the common conveyance paths 311, 411, 511, and 611 of the stacking units 3 to 6, the paper sheets 100 that pass through each common conveyance path 311 to 611 are detected by the optical sensors 36, 46, 56, 66 respectively provided in the common conveyance paths 311 to 611.

In the paper sheet processing device 1, the passage of the paper sheets 100 in the common conveyance path 311 of the stacking unit 3 is detected by the optical sensor 36, and the detection signal generated by the optical sensor 36 and the unit type information are transmitted to the connection port P1 of the counting unit 2.

After that, the passage of the paper sheets 100 in the common conveyance paths 411 to 611 of the stacking units 4 to 6 is detected by the optical sensors 46 to 66 provided in the common conveyance paths 411 to 611. The detection signals generated by the optical sensors 46 to 66 and the unit type information are transmitted to the connection ports P3, P2, and P4 of the counting unit 2 in the order of detection by the optical sensors 46 to 66.

<Display Screen>

As described above, the information relating to the medium processing device 1 is displayed on the display screen 241 of the operation display portion 24. A display example of the display screen 241 of the operation display portion 24 will be described.

Figure 11:
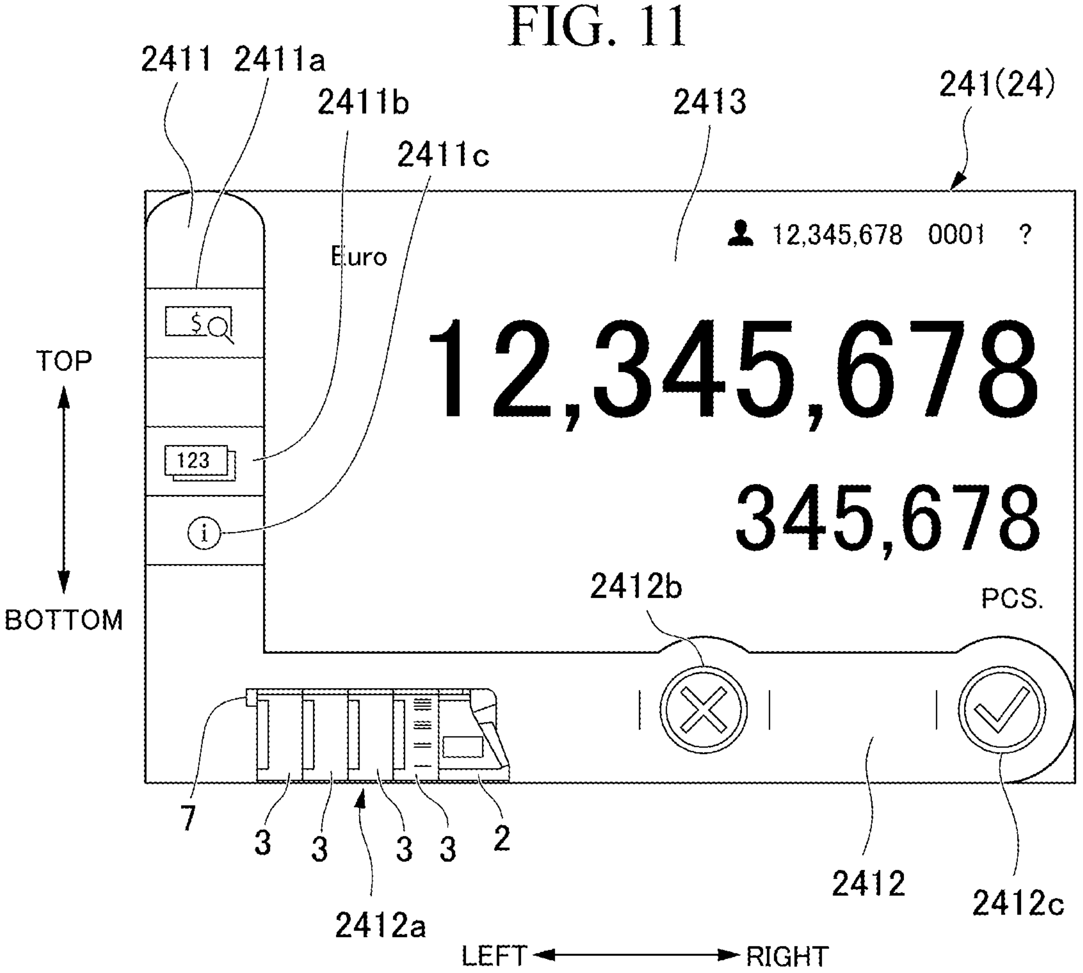
FIG. 11 is a diagram illustrating a display example of a display screen of the medium processing device according to the embodiment.

FIG. 11 is a diagram illustrating a display example of the display screen 241 of the operation display portion 24.

As shown in FIG. 11, when the operation display portion 24 is viewed from the front, the display screen 241 includes a first display area 2411 extending in the vertical direction. The first display area 2411 is provided linearly in the vertical direction along the left end portion of the display screen 241.

A plurality of function selection buttons (operation buttons) 2411*a* to 2411*c* are provided in the first display area 2411. When the operator selects any of the function selection buttons 2411*a* to 2411*c*, various settings and controls are performed according to the function selection button that was selected.

When the operation display portion 24 is viewed from the front, the display screen 241 includes a second display area 2412 from the lower end of the first display area 2411 rightward. The second display area 2412 is provided in a linear manner along the lower side of the display screen 241.

In the second display area 2412, a device connection state diagram 2412*a* is displayed showing the connection state with the counting unit 2 of the medium processing device 1 described above, and the stacking unit 3 connected to the counting unit 2, a terminal accommodation cover 7, and the like. The device connection state diagram 2412*a* shows what kind of stacking unit 3, sealing unit (not shown), terminal accommodation cover 7, and the like are connected to the counting unit 2, which is the base of the medium processing device 1. In the embodiment, a case is shown where along with four stacking units 3 being connected to the counting unit 2, the terminal accommodation cover 7 is connected to the last stacking unit 3 of the four stacking units 3. In the device connection state diagram 2412*a*, when the banknotes are stacked up in the stacking portion 32, visibility is improved by displaying in color or the like. This makes it easier for the operator to know which stacking portion 32 the banknotes are stacked in.

More specifically, as will be described later, the device connection state diagram 2412*a* generated according to the number and type of units determined or recognized by the setting work of a plurality of units is displayed in the second display area 2412. That is, when the control portion 25 recognizes that the device configuration is as shown in FIG. 1, the device connection state diagram 2412*a* is displayed in which four stacking units 3 are connected and the terminal accommodation cover 7 is connected behind the last stacking unit 3. Further, by increasing or decreasing the number of units and performing the work of setting the units, the control portion 25 recognizes a new connection configuration and displays the device connection state diagram 2412*a* corresponding thereto.

As described above, the first display area 2411 and the second display area 2412 are substantially L-shaped in front view, with predetermined function selection buttons 2411*a* to 2411*c* and function selection buttons 2412*b* and 2412*c* being arranged in the respective areas. Further, the display screen 241 includes a third display area 2413, which is partitioned by the first display area 2411 and the second display area 2412.

In the third display area 2413, for example, when a predetermined setting is selected by using the function selection buttons 2411*a* to 2411*c* of the first display area 2411, a setting screen corresponding to the selected setting is displayed. In the third display area 2413, for example, a diagram showing the counting result of money counted by the medium processing device 1, and the connection state between the counting unit 2, the stacking unit 3 and the terminal accommodation cover 7 are displayed.

The width of the first display area 2411 and the second display area 2412 is automatically changed according to the size and width of the function selection buttons 2411*a* to 2411*c*, 2412*b*, 2412*c* and the device connection state diagram 2412*a*. A part of the first display area 2411 and the second display area 2412 is enlarged or reduced depending on whether or not the function selection buttons 2411*a* to 2411*c*, 2412*b* and 2412*c* are displayed.

<How to Set Connection Order of Expansion Units>

Next, a method of setting the connection order of the stacking units 3 to 6 with respect to the counting unit 2 will be described.

The medium processing device 1 has a stacking mode and a connection order setting mode. In the stacking mode, the medium processing device 1 sorts and stacks the paper sheets 100 charged into the receiving portion 21 of the counting unit 2 in the stacking portions 32, 42, 52 of the stacking units 3 to 6 according to the paper sheet type. In the connection order setting mode, the medium processing device 1 conveys the paper sheets 100 that were charged into the receiving portion 21 of the counting unit 2 to the terminal accommodation cover 7 through the common conveyance paths 311, 411, 511, 611 of the stacking units 3 to 6, without any sorting by any of the stacking units 3 to 6.

The connection order of the stacking units 3 to 6 with respect to the counting unit 2 described below is set in the connection order setting mode described above. This connection order setting mode is executed when the medium processing device 1 is installed because the installation worker who installs the medium processing device 1 sets the connection order of the expansion unit with respect to the counting unit 2.

<Connection Order Setting Process in Counting Unit>

First, the connection order setting process performed by the control portion 25 of the counting unit 2 will be described.

Figure 12:
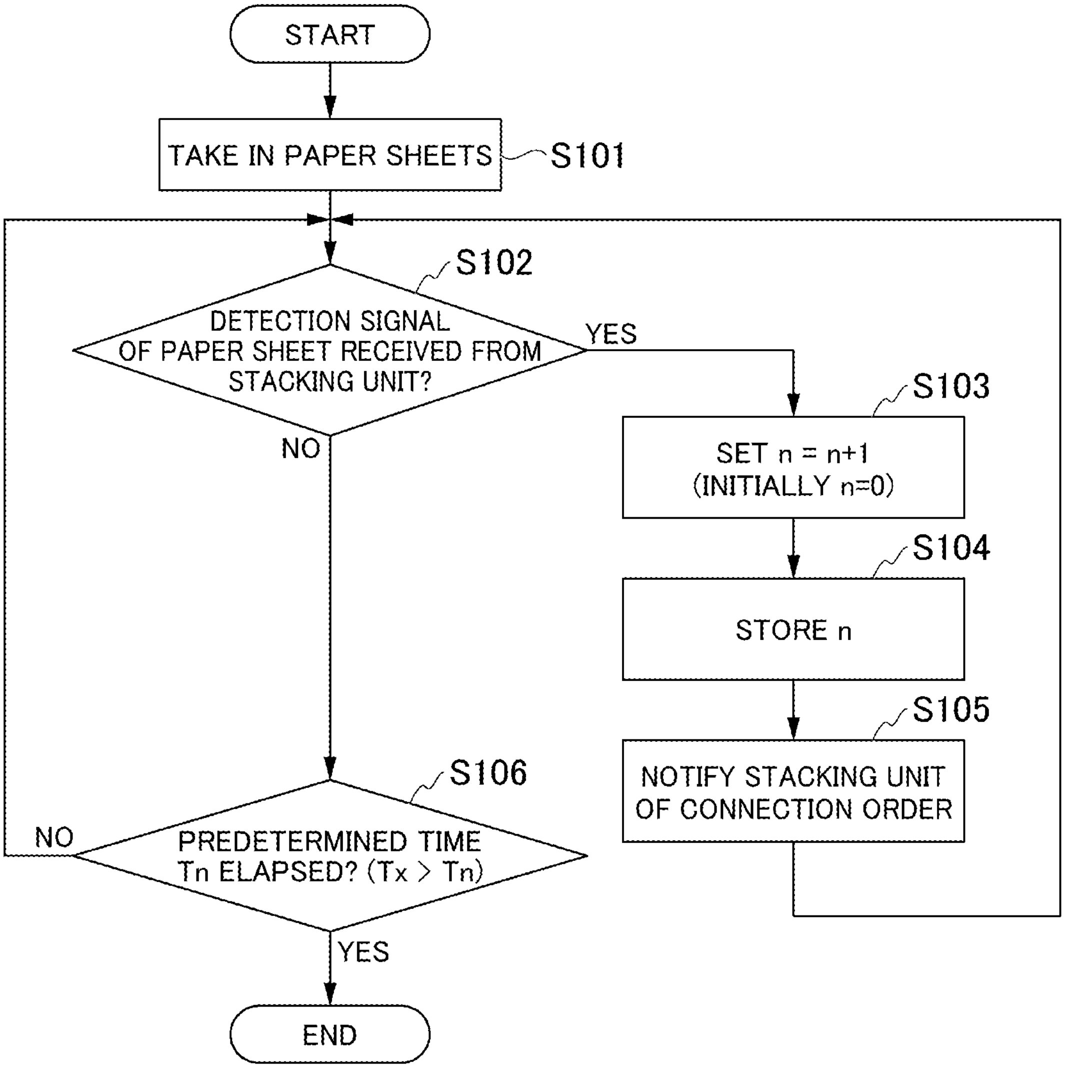
FIG. 12 is a flowchart showing the connection order setting process performed by the counting unit of the medium processing device according to the embodiment.

FIG. 12 is a flowchart showing a connection order setting process performed by the counting unit 2 of the medium processing device 1.

As shown in FIG. 12, in Step S101, the control portion 25 of the counting unit 2 uses the kick-out roller 217 to take the paper sheets 100 charged into the receiving portion 21 of the counting unit 2 into the counting main body portion 22 of the counting unit 2. After being taken in, the counting sheets 100 are delivered to the endo-stacking unit conveying mechanism 31 of the stacking unit 3 by endo-counting unit conveying mechanism 223.

In Step S102, the control portion 25 determines whether or not a detection signal generated by detecting with the optical sensor 36 the paper sheets 100 conveyed along the endo-stacking unit conveying mechanism 31 (common conveyance path 311) and unit type information of the stacking unit 3 were received from the stacking unit 3.

When the control portion 25 determines that the detection signal from the optical sensor 36 and the unit type information of the stacking unit 3 have been received (Step S102: YES), the control portion 25 advances to the process of Step S103. When the control portion 25 determines that the detection signal from the optical sensor 36 and the unit type information of the stacking unit 3 have not been received (Step S102: NO), the control portion 25 advances to the process of Step S106.

In Step S103, the control portion 25 increases the value of the order counter "n" indicating the order of reception of the detection signal received from the stacking unit 3 by "+1". In the embodiment, the order counter "n" is set to "0" as an initial value at the start of the connection order setting mode. When the detection signal that is generated upon detection of the paper sheet 100 is received from the optical sensor 36 of the stacking unit 3, the value of the order counter "n" becomes "1". As a result, the control portion 25 determines that the detection signal received from the stacking unit 3 is the first received signal and that the connection order of the stacking unit 3 is the first. Therefore, the control portion 25 determines that the expansion unit connected to the connection port P1 of the counting unit 2 is the stacking unit 3, and that this stacking unit 3 is connected first.

In Step S104, the control portion 25 stores the value of the order counter "n (=1)" updated in Step S103 in a storage device (not shown) such as a ROM of the control portion 25.

In Step S105, the control portion 25 transmits the value of the order counter "n (=1)" calculated in Step S103 to the control portion 34 of the stacking unit 3, which is the transmission source of the detection signal of the paper sheets 100 and the unit type information. In the embodiment, the control portion 25 transmits the order counter "1" to the control portion 34 of the stacking unit 3 and returns to the process of Step S102.

Next, upon having determined that the detection signal indicating detection of the paper sheet 100 and the unit type information have not been received from the optical sensor 36 of the stacking unit 3 (Step S102: NO), in Step S106, the control portion 25 determines whether or not the time Tx during which the detection signal of the paper sheet 100 is not received from the stacking unit 3 has exceeded the predetermined time Tn (Tx>Tn). In an example of the embodiment, the predetermined time Tn is set to "3 seconds". Upon having determined that the detection signal from the optical sensor 36 of the stacking unit 3 has not been received for more than "3 seconds", the control portion 25 determines there to be a conveyance error (jam) of the paper sheet 100 in the stacking unit 3 or that the stacking unit 3 is the last stacking unit connected to the counting unit 2, and ends the connection order setting mode.

In Step S106, upon having determined that the time Tx during which a detection signal is not received from the optical sensor 36 of the stacking unit 3 does not exceed the predetermined time Tn (3 seconds) (Step S106: NO), the control portion 25 returns to the process of S102. The control portion 25 waits for reception of the detection signal from the stacking unit until determining that the time Tx during which the detection signal is not received from the optical sensor exceeds the predetermined time Tn.

The control portion 25 repeats the above-mentioned processes of steps S101 to S106 until the paper sheets 100 pass all the stacking units 3 to 6.

<Paper Sheet Detection Process in Stacking Unit>

Next, the paper sheet detection process performed by the control portion 34 of the stacking unit 3 will be described. This paper sheet detection process is performed in the connection order setting mode described above.

Figure 13:
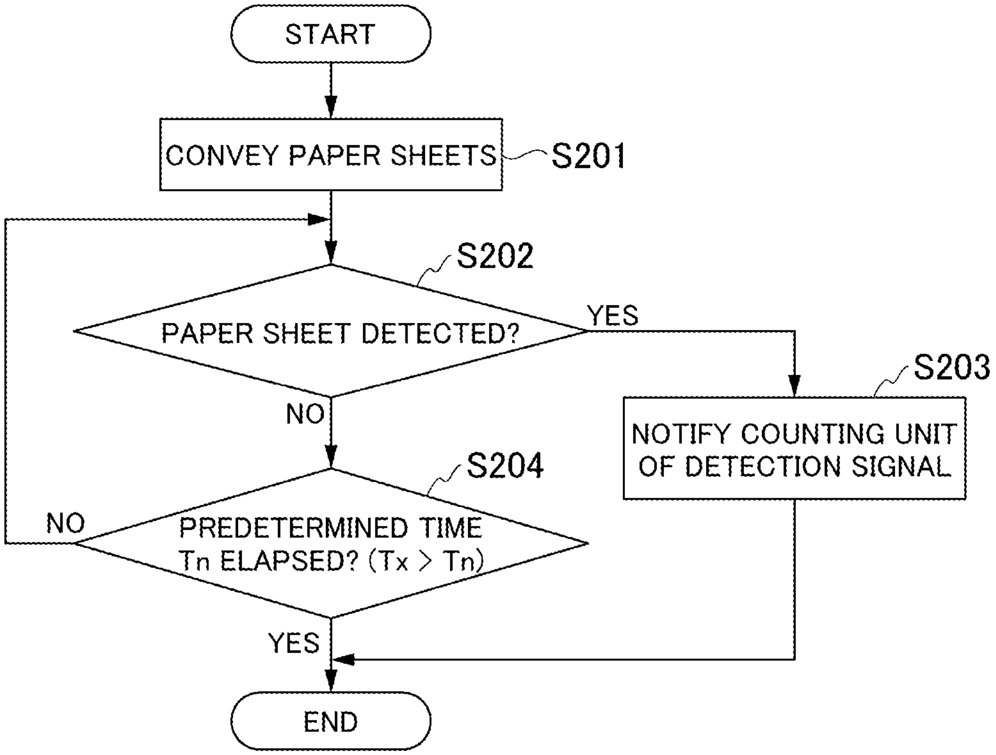
FIG. 13 is a flowchart showing a paper sheet detection process performed by the stacking unit of the medium processing device according to the embodiment.

FIG. 13 is a flowchart showing a paper sheet detection process performed by the control portion 34 of the stacking unit 3.

As shown in FIG. 13, in Step S201, the control portion 34 of the stacking unit 3 controls the conveyance sorting mechanism (not shown). The control portion 34 of the stacking unit 3 does not convey the paper sheet 100 received from the carry-out side conveyance path 223*d* of the counting unit 2 to the branch conveyance path 312, but instead conveys the paper sheet 100 along the common conveyance path 311 to deliver the paper sheet 100 to the common conveyance path 411 of the stacking unit 4.

In Step S202, the control portion 34 determines whether or not the optical sensor 36 has detected the paper sheet 100 conveyed along the common conveyance path 311.

Upon having determined that the optical sensor 36 has detected the paper sheet 100 conveyed along the common conveyance path 311 (Step S202: YES), in Step S203, the control portion 34 transmits to the control portion 25 of the counting unit 2 a detection signal generated on the basis of the optical sensor 36 having detected the paper sheet 100, and ends the process.

On the other hand, upon having determined that the optical sensor 36 has not detected the paper sheet 100 conveyed along the common conveyance path 311 (Step S202: NO), the control portion 34 performs the process of Step S204.

In Step S204, the control portion 34 determines whether or not the time Tx during which the paper sheet 100 is not detected by the optical sensor 36 has exceeded the predetermined time Tn (Tx>Tn). In the example of the embodiment, the predetermined time Tn is set to "3 seconds". Upon having determined that the time Tx during which the paper sheet 100 is not detected by the optical sensor 36 has exceeded "3 seconds" (Step S204: YES), the control portion 34 determines that a conveyance error (for example, a jam) of the paper sheet 100 has occurred in the stacking unit 3 and ends the process.

On the other hand, upon having determined that the time Tx during which the paper sheet 100 is not detected by the optical sensor 36 is "3 seconds" or less (Step S204: NO), the control portion 34 returns to Step S202 and continuously determines whether or not the paper sheet 100 is detected by the optical sensor 36 until the time Tx during which the paper sheet 100 is not detected by the optical sensor 36 exceeds the predetermined time "3 seconds".

<Connection Order Storage Process in Stacking Unit>

Next, the connection order storage process performed by the control portion 34 of the stacking unit 3 will be described. This connection order storage process is performed in the connection order setting mode described above.

Figure 14:
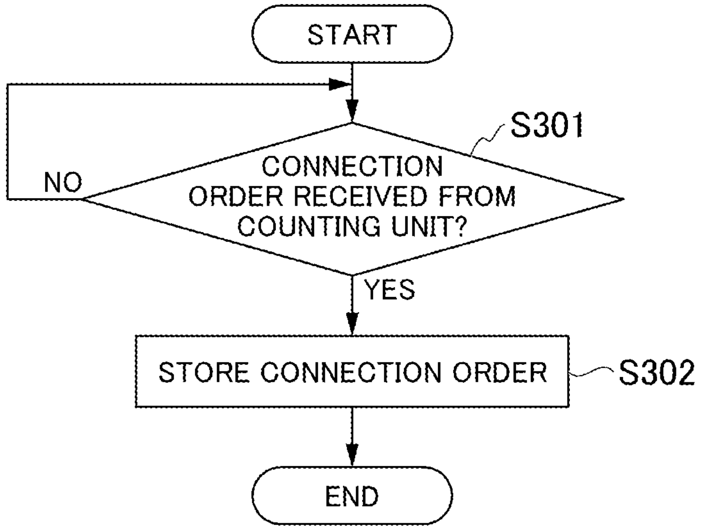
FIG. 14 is a flowchart showing a connection order storage process performed by the stacking unit of the medium processing device according to the embodiment.

FIG. 14 is a flowchart showing a connection order storage process performed by the control portion 34 of the stacking unit 3.

As shown in FIG. 14, in Step S301, the control portion 34 of the stacking unit 3 determines whether or not the value of the order counter "n" has been received from the control portion 25 of the counting unit 2 (Step S105 of FIG. 12). Upon having determined that the value of the order counter "n" has been received (Step S301: YES), the control portion 34 proceeds to the process of Step S302. On the other hand, upon having determined that the value of the order counter "n" has not been received (Step S301: NO), the control portion 34 waits until the value of the order counter "n" is received from the control portion 25. In the embodiment, the value of the order counter "n" first received by the control portion 34 is "1".

In Step S302, the control portion 34 stores the value of the order counter "n (=1)" received from the control portion 25 of the counting unit 2 in the storage portion 35, and ends the process.

The control portion 34 of the stacking unit 3 transmits the value of the order counter "n (=1)" stored in the storage portion 35 to the control portion 25 of the counting unit 2 in response to a predetermined transmission request.

<Connection Order Transmission Process in Stacking Unit>

Next, the connection order transmission process performed by the control portion 34 of the stacking unit 3 will be described. This connection order transmission process is performed in the connection order setting mode described above.

Figure 15:
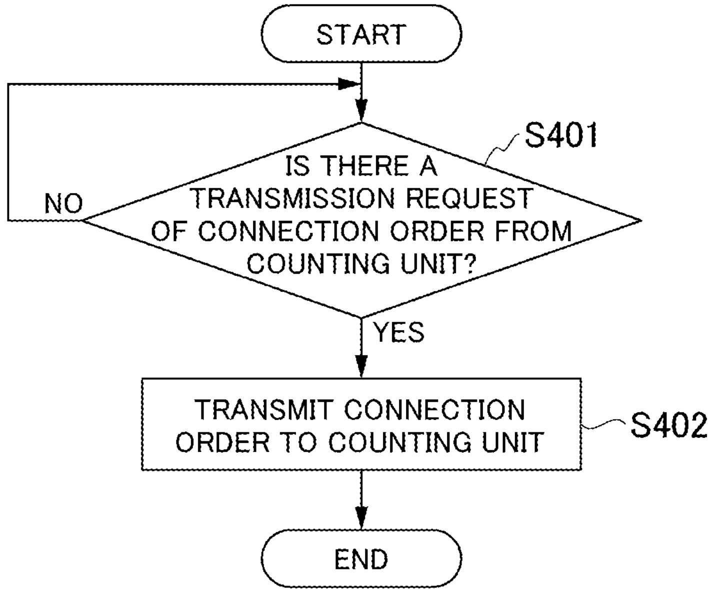
FIG. 15 is a flowchart showing a connection order transmission process performed by the stacking unit of the medium processing device according to the embodiment.

FIG. 15 is a flowchart showing the connection order transmission process performed by the control portion 34 of the stacking unit 3.

In Step S401, the control portion 34 of the stacking unit 3 determines whether or not there is a transmission request for the connection order from the control portion 25 of the counting unit 2.

Upon determining that there is a transmission order transmission request from the control portion 25 of the counting unit 2 (Step S401: YES), in Step S402 the control portion 34 transmits the value of the order counter "n (=1)" stored in the storage portion 35 to the control portion 25 of the counting unit 2.

On the other hand, upon determining that there is no transmission request for the connection order from the control portion 25 of the counting unit 2 (Step S401: NO), the control portion 34 waits until there is a transmission request (the process of Step S401 is repeated).

As an example of the transmission request for the connection order described above, there is a case where the main power supply of the medium processing device 1 is turned off. Even if the storage content of the connection order of the expansion unit stored in the RAM or the like of the control portion 25 is erased by disconnecting the main power supply of the medium processing device 1, the control portion 25 of the counting unit 2 can acquire the connection order stored in each expansion unit. Therefore, the connection order of the stacking units 3 to 6 can be reset without setting the medium processing device 1 to the connection order setting mode and once again performing the work of conveying the paper sheets 100 and setting the connection order of the stacking units 3 to 6.

The control portion 25 of the counting unit 2 performs a transmission request for the connection order, and on the basis of the value of a series of order counters "nx" received in the previous connection order setting process from each expansion unit (the stacking units 3 to 6 in the embodiment), and the value of a series of order counters "nt" received in the current connection order setting process, can check the continuity of changes in the connection order of expansion units, changes in the types of expansion units, increases or decreases in the number of expansion units, and the like.

<Continuity Check Process>

Next, the process of the expansion unit continuity check by the control portion 25 of the counting unit 2 will be described.

Figure 16:
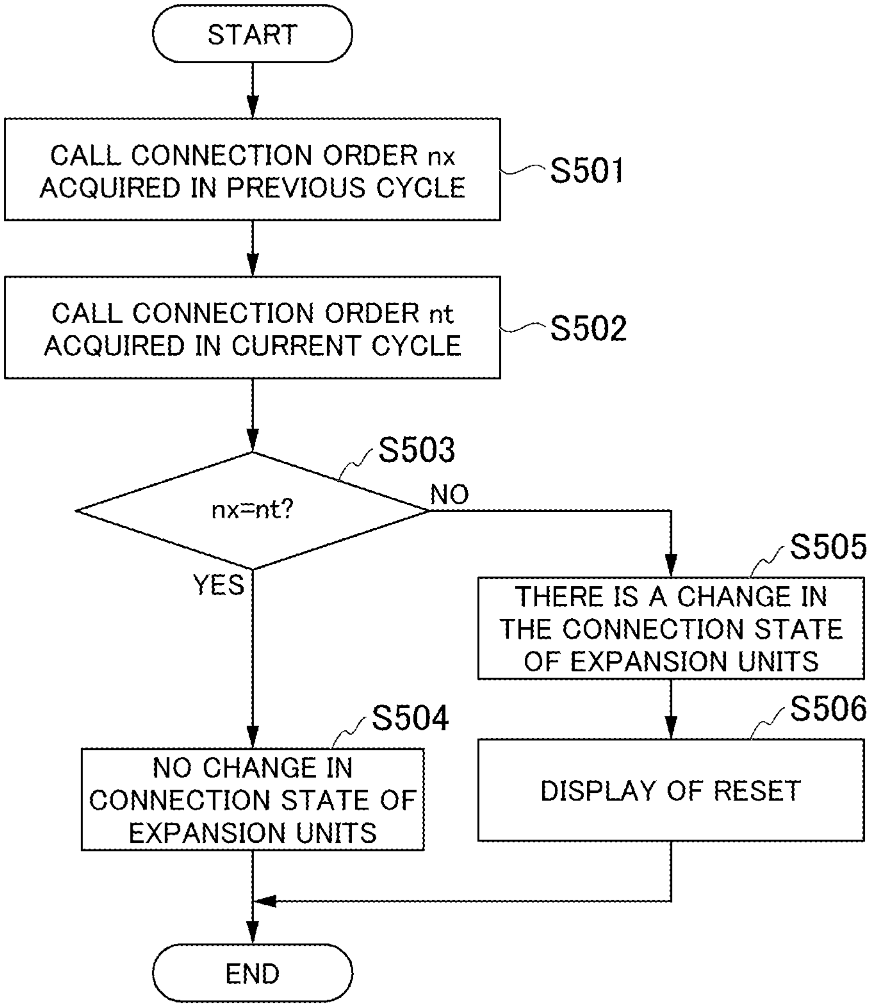
FIG. 16 is a flowchart showing a process of checking the continuity of an expansion unit performed by the counting unit of the medium processing device according to the embodiment.

FIG. 16 is a flowchart showing the process of checking the continuity of the expansion units performed by the control portion 25 of the counting unit 2.

In Step S501, the control portion 25 of the counting unit 2 calls the value of the series of order counters "nx" for each stacking unit 3 to 6 acquired in the previous connection order setting process received from each stacking unit 3 to 6 (expansion unit) stored in a storage device (not shown) such as ROM of the control portion 25.

In Step S502, the control portion 25 of the counting unit 2 calls the value of the series of order counters "nt" of each of the stacking units 3 to 6 acquired in the current connection order setting process.

In Step S503, the control portion 25 compares the values of the series of order counters "nx" acquired in the previous time with the values of the series of order counters "nt" received this time from each stacking unit (expansion unit). When the values of the series of order counters "nt" received this time and the values of the series of order counters "nx" received last time are all the same (nt=nx), the control portion 25 proceeds to the process of Step S504. When at least some of the values of the series of order counters "nt" and the values of the series of order counters "nx" are different (nt>nx or nt<nx), the control portion 25 proceeds to the process of Step S505.

In Step S504, when the control portion 25 has determined that the values of the series of order counters "nx" acquired last time and the series of order counters "nt" acquired this time completely match (Step S504: YES), the control portion 25 determines that there is no change in the connection state (connection order, increase/decrease, unit type) of the stacking units 3 to 6 (expansion units) connected to the counting unit 2.

On the other hand, when the control portion 25 has determined that at least some the values of the series of order counters "nx" acquired last time and the series of order counters "nt" acquired this time differ (Step S504: NO), in Step S505 the control portion 25 determines that the connection state (connection order, increase/decrease, unit type) of the stacking units 3 to 6 (expansion units) connected to the counting unit 2 has changed.

Then, in Step S506, the control portion 25 requests the installation worker to reset the connection order by displaying in the operation display portion 24 (FIG. 1) that it is necessary to reconvey the paper sheets 100 and reset the connection order of each stacking unit, and then ends the process.

In the above-described embodiment the case was illustrated of the control portion 25 of the counting unit 2 ending the connection order setting mode when the predetermined time Tn has elapsed in a state of a detection signal indicating detection of the paper sheet 100 not being input from any of the optical sensors 36, 46, 56, 66 of the stacking units 3 to 6 during the connection order setting mode, and determining the stacking unit 3 to 6 that output a detection signal from the optical sensor 36, 46, 56, 66 last received during this connection order setting mode to be the last stacking unit 3 to 6 farthest from the counting unit 2. However, the detection method of the stacking unit 3 to 6 connected last among the stacking units 3 to 6 connected to the counting unit 2 is not limited thereto.

For example, an installation worker (not shown) who installs the medium processing device 1 may input in advance the number of stacking units (expansion units) connected to the counting unit 2 from the operation display portion 24 of the counting unit 2. By doing so, the control portion 25 compares the number of stacking units input in advance with the value of the order counter "n", and when the updated value of the order counter "n" matches the input number, it can be determined that the stacking unit 3 to 6 that transmitted the order counter "n" is the stacking unit last connected to the counting unit 2.

Further, in the medium processing device 1, the stacking unit last connected to the counting unit 2 may be detected by attaching the terminal accommodation cover 7 at the end of the downstream side of the plurality of stacking units 3 to 6 (in the embodiment, the stacking unit 6) sequentially connected to the counting unit 2. Specifically, the attachment of the terminal accommodation cover 7 is detected by the stacking unit 3 to 6, and a signal indicating the attachment of the terminal accommodation cover 7 is transmitted to the control portion 25 of the counting unit 2. By doing so, the control portion 25 can determine that the stacking unit 3 to 6 that transmitted the signal indicating that the terminal accommodation cover 7 is attached is the unit connected last to the counting unit 2. In this case, each of the stacking units 3 to 6 may include a dedicated detection sensor for detecting the terminal accommodation cover 7. By providing the terminal accommodation cover 7 so as to cross the optical axis of each optical sensor provided in the common conveyance paths 311, 411, 511, 611 of the stacking units 3 to 6, the terminal accommodation cover 7 may be detected by the optical sensor. In this case, the conventional configuration can be used as is, and the product cost can be suppressed.

As described above, in the embodiment, the medium processing device 1 has the following configuration.

(1) A medium processing device 1 including a counting unit 2 (first unit) and a plurality of stacking units 3 to 6 (second units) connected to the counting unit 2, the plurality of stacking units 3 to 6 respectively including a common conveyance path 311, 411, 511, 611 (conveying mechanism) that conveys a paper sheet 100 (medium), and an optical sensor 36, 46, 56, 66 (medium detection portion) that detects the paper sheet 100 conveyed by the common conveyance path 311, 411, 511, 611, being configured to determine the connection order of the plurality of stacking units 3 to 6 with respect to the counting unit 2 on the basis of signals indicating that the optical sensors 36, 46, 56, 66 of the plurality of stacking units 3 to 6 have detected the paper sheet 100.

With this configuration, the medium processing device 1 determines the connection order of the plurality of stacking units 3 to 6 with respect to the counting unit 2 on the basis of a detection signal of the paper sheet 100 received from each of the stacking units 3 to 6. Therefore, it is possible to accurately, easily and automatically set the connection order of the plurality of stacking units 3 to 6 with respect to the counting unit 2. Further, it is not necessary to provide a physical setting means (switch or the like), and so the product cost can be reduced.

(2) The counting unit 2 is configured to determine the connection order of the plurality of stacking units 3 to 6 with respect to the counting unit 2 on the basis of the order in which the detection signals indicating detection of the paper sheets 100 transmitted from each of the optical sensors 36, 46, 56, 66 of the plurality of stacking units 3 to 6 are received.

With this configuration, the counting unit 2 determines the connection order of the stacking units 3 to 6 on the basis of the order of the detection signals of the paper sheets 100 received from each of the plurality of stacking units 3 to 6, and so can accurately and easily set the connection order of the plurality of stacking units 3 to 6 with respect to the counting unit 2. Further, it is not necessary to provide a physical setting means (switch or the like), and so the product cost can be reduced.

(3) The counting unit 2 is configured to be positioned at a higher order than the plurality of stacking units 3 to 6 in the control system of the medium processing device 1.

In the control system of the medium processing device 1, in order to perform control of the lower order stacking units 3 to 6, the higher order counting unit 2 needs to recognize the connection order of the respective stacking units 3 to 6. With this configuration, the counting unit 2 can automatically recognize the connection order of the respective stacking units 3 to 6, and so can appropriately perform control of the stacking units 3 to 6.

(4) The plurality of stacking units 3 to 6 are configured to have common functions (in the embodiment, common conveyance paths 311, 411, 511, 611, optical sensors 36, 46, 56, 66, and a conveyance sorting mechanism).

In this type of medium processing device 1, it is desirable that each of the plurality of stacking units 3 to 6 has a common function from the viewpoint of versatility and productivity. As an example of the common function, each of the plurality of stacking units 3 to 6 has a common conveyance path 311, 411, 511, 611 for conveying the paper sheets 100, optical sensors 36, 46, 56, 66, and a conveyance sorting mechanism (not shown) for sorting the paper sheets 100 to the target stacking unit 3 to 6.

When installing the medium processing device 1 in the field, in terms of advantages with respect to transportation of the medium processing device 1, it is preferable to transport the counting unit 2 and each of the stacking units 3 to 6 separately, and then connect the counting unit 2 and the stacking units 3 to 6 by wiring at the installation location. Since the medium processing device 1 described above can automatically determine and set the connection order of the plurality of stacking units 3 to 6 with respect to the counting unit 2 on the basis of a detection signal indicating detection of the paper sheets 100 received from each of the stacking units 3 to 6, the medium processing device 1 can accurately and easily set the connection order of the stacking units 3 to 6 to the counting unit 2 during installation.

(5) Among the plurality of expansion units, at least one expansion unit (for example, a sealing unit) has a function different from that of another expansion unit (for example, a stacking unit) (for example, a sealing function for wrapping a band around a bundle of paper sheets).

With this configuration, in the medium processing device 1, the counting unit 2 and a plurality of expansion units having different functions connected to the counting unit 2 can be easily connected in any order. Therefore, in the medium processing device 1, the counting unit 2 and the plurality of expansion units having different functions can be appropriately connected in an arbitrary order, and the flexibility of unit connection in the medium processing device 1 can be enhanced.

(6) The counting unit 2 is a counting unit having the receiving portion 21 (reception portion) that receives the paper sheets 100, and the endo-counting unit conveying mechanism 223 (conveying portion) capable of conveying the paper sheets 100 received by this receiving portion 21 to the side of the plurality of stacking units 3 to 6, in which the plurality of stacking units 3 to 6 are expansion units respectively having the common conveyance path 311, 411, 511, 611 (first conveyance path) for conveying the paper sheets 100 in the horizontal direction (first direction); the branch conveyance path 312, 412, 512, 612 for conveying the paper sheets 100 in a vertical direction (second direction) different from the horizontal direction; and an optical sensor 36, 46, 56, 66 (detection device) that detects the paper sheets 100 conveyed along the common conveyance path or branch conveyance path, a plurality of the stacking units 3 to 6 being coupled in a state of at least one of the common conveyance path and the branch conveyance path being communicated with each other; and the counting unit 2 determining the connection order of the stacking units 3 to 6 on the basis of the order of receiving signals indicating detection of the paper sheets 100 conveyed by at least one of the common conveyance path and the branch conveyance path of the coupled stacking units 3 to 6 by the respective optical sensor 36, 46, 56, 66 of the stacking sensors 3 to 6.

With this configuration, by connecting a plurality of stacking units 3 to 6 to the counting unit 2 in the medium processing device 1, it is possible to improve the flexibility of sorting the paper sheets 100 identified and counted by the counting unit 2 to the stacking units 3 to 6. For example, by making the stacking units 3 to 6 have a plurality of the stacking portions 32, 42, 52, 62 stacking the paper sheets 100 or serve as sealing units that seal bundles of the stacked paper sheets 100 instead of the stacking units 3 to 6, stacking and sealing of multiple denominations becomes possible. On the other hand, if the number of expansion units connected to the counting unit 2 increases, the wiring connection of the expansion units with respect to the counting unit 2 becomes complicated. As described above, the medium processing device 1 determines the connection order of the plurality of expansion units 3 with respect to the counting unit 2 on the basis of a signal indicating detection of the paper sheets 100 received from the optical sensor provided in each of the expansion units. Therefore, the medium processing device 1 can accurately, easily and automatically set the connection order of the expansion units with respect to the counting unit 2. Further, it is not necessary to provide a physical setting means (switch or the like), and so the product cost can be reduced.

(7) The counting unit 2 is constituted to notify the stacking units 3 to 6 corresponding to the connection order of the determined connection order of the stacking units 3 to 6.

With this configuration, as a result of the counting unit 2 being able to notify each of the stacking units 3 to 6 of the connection order of the stacking unit 3 to 6 itself, each of the stacking units 3 to 6 can recognize its own connection order among the plurality of stacking units 3 to 6.

(8) The plurality of stacking units 3 to 6 are respectively configured to have storage units 35, 45, 55, and 65 that store the connection order notified from the counting unit 2.

With this configuration, each of the plurality of stacking units 3 to 6 can store its own connection order in the storage portion 35, 45, 55, 65. As a result, in the medium processing device 1, after the power is turned on, the counting unit 2 can acquire the connection order from the storage portion 35, 45, 55, 65 of the stacking units 3 to 6 without the need to convey the paper sheets 100 again to set the connection order.

(9) The plurality of stacking units 3 to 6 are configured to transmit their own connection order stored in the storage units 35, 45, 55, 65 to the counting unit 2.

With this configuration, since each of the plurality of stacking units 3 to 6 transmits its own connection order to the counting unit 2, the counting unit 2 can recognize the connection order of the plurality of stacking units 3 with respect to the counting unit 2 without the need to convey the paper sheets 100 again after turning on the power.

The counting unit 2 is configured to receive the connection order (first connection order) in the previous cycle from the plurality of stacking units 3 to 6 in a first timing (previous cycle in Step S501 of FIG. 16), receive the connection order (second connection order) in the current cycle from the plurality of stacking units 3 to 6 in a second timing after the first timing in chronological order (the current cycle in Step S502 in FIG. 16), compare the connection order in the previous cycle received at the first timing with the connection order in the current cycle received at the second timing, and determine whether or not there is continuity (identity) between the connection order in the previous cycle and the connection order in the current cycle (Step S503 in FIG. 16).

With this configuration, if the counting unit 2 determines that there are duplications or omissions in the connection order received from the plurality of stacking units 3 to 6 in the previous cycle and the current cycle, the counting unit 2 can recognize the possibility of recombination of the plurality of stacking units 3 to 6 between the previous period and the current period, and can prompt a reset of the connection order. That is, the counting unit 2 determines whether or not there is continuity (identity) in the connection order between the previous cycle and the current cycle received from the plurality of stacking units 3 to 6. When the counting unit 2 determines that there is no continuity (identity), the counting unit 2 can convey the paper sheets 100 again and determine the connection order in the latest state.

(11) Further provided is an operation display portion 24 (display device) that displays information relating to the medium processing device 1, the operation display portion 24 being configured to have a first display area 2411 and a second display area 2412 that is provided close to or in contact with the first display area 2411, and the determined connection order between the counting unit 2 and the stacking units 3 to 6 being displayed in at least one of the first display area 2411 and the second display area 2412.

With this configuration, since the connection order between the counting unit 2 and the stacking units 3 to 6 determined by the control portion 25 is displayed in at least one of the first display area 2411 and the second display area 2412 of the operation display unit 24, it is possible to easily ascertain the connection state of the unit.

(12) The first display area 2411 is provided extending in the vertical direction with respect to the display area of the operation display portion 24, and the second display area 2412 is provided extending in the left-right direction with respect to the display area of the operation display portion 24, and the connection state between the counting unit 2 and the stacking units 3 to 6 is displayed in the second display area 2412.

With this configuration, since the connection status of the counting unit 2 and the stacking units 3 to 6 is displayed in the second display area 2412 extending in the left-right direction of the display area, the connection status of each unit can be seen at a glance and visibility is improved.

(13) The second display area 2412 is configured be provided extending in either one direction in the left-right direction from either end extending in the vertical direction of the first display area 2411.

With this configuration, the first display area 2411 and the second display area 2412 are arranged roughly in an L-shape in front view. As a result, since the function selection buttons 2411*a* to 2411*c* (operation portions) for controlling the medium processing device 1 are arranged in the vertical direction of the operation display unit 24, and the connection state of the unit is arranged in the left-right direction of the operation display unit 24, it is easy to visually ascertain and the visibility can be further improved.

Second Embodiment

In the above-described embodiment, the case of the counting unit 2 and the stacking units 3 to 6 (expansion units) being connected in parallel was described as an example, but the counting unit 2 and the stacking units 3 to 6 (expansion units) may be connected in series.

Hereinbelow, a medium processing device 1A when a counting unit 2A and stacking units 3A to 6A are connected in series will be described. In the medium processing device 1A according to the second embodiment, the same configurations and functions as those of the medium processing device 1 according to the first embodiment described above are designated by the same reference numerals and will be described as necessary.

Figures 17, 18:
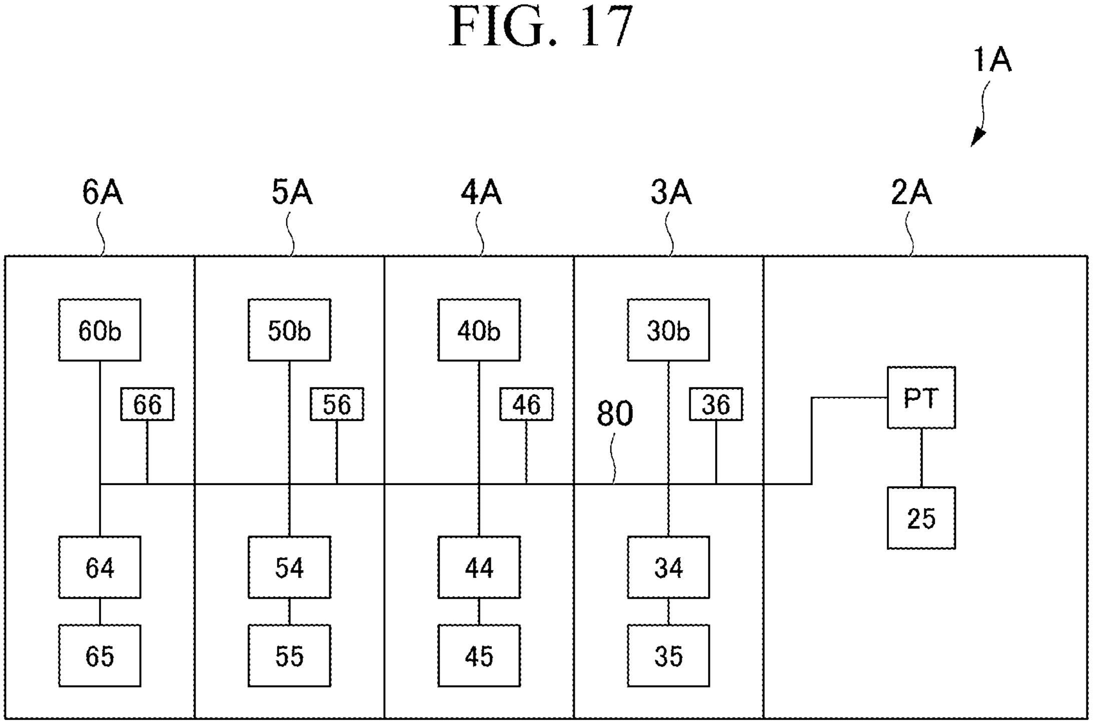
FIG. 17 is a schematic configuration diagram illustrating a connection state between the counting unit and the stacking unit in the medium processing device according to the second embodiment.
FIG. 18 is a diagram illustrating an example of information transmitted to the control portion of the counting unit according to the second embodiment.

FIG. 17 is a schematic configuration diagram illustrating a connection state between the counting unit 2A and the stacking units 3A to 6A in the medium processing device 1A according to the second embodiment. In the example of FIG. 17, the connection relationship by the cable between the counting unit 2A and the stacking units 3A to 6A is in series.

FIG. 18 is a diagram illustrating an example of information transmitted to the control portion 25 of the counting unit 2A according to the second embodiment.

Figure 19:
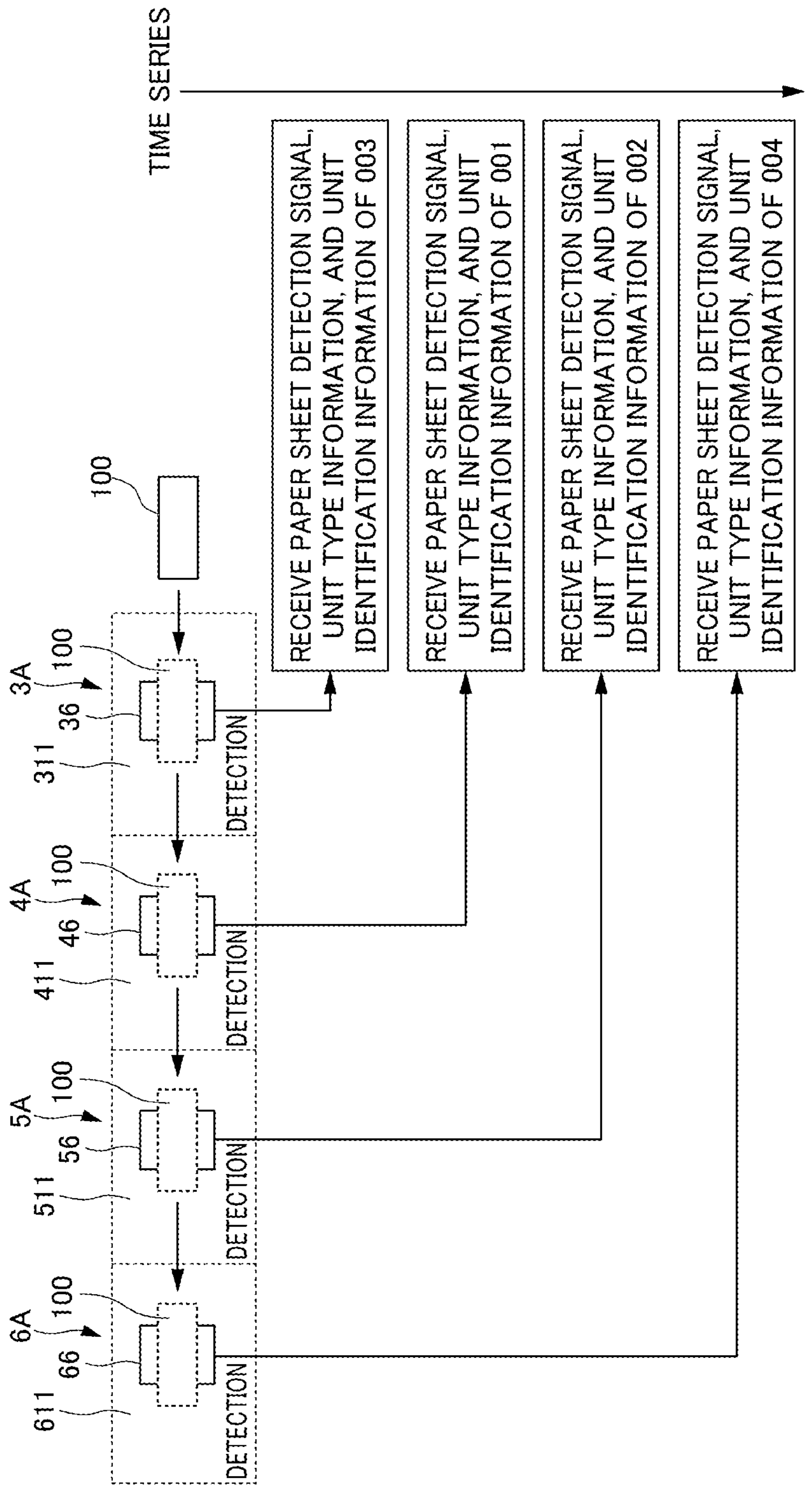
FIG. 19 is a drawing that describes an example of the reception status, in the counting unit, of the reception signal generated by each stacking unit when the counting unit and the stacking unit of the medium processing device according to the second embodiment are connected in series.

FIG. 19 is a diagram explaining, in the case of the counting unit 2A and the stacking units 3A to 6A of the medium processing device 1A according to the second embodiment being connected in series, an example of the reception state in the counting unit 2A of the reception signals generated in each stacking unit 3A to 6A.

As shown in FIG. 17, in the medium processing device 1A, the serial connection terminals 30*b*, 40*b*, 50*b*, 60*b* respectively provided in the stacking units 3A to 6A and the serial connection connector PT of the counting unit 2A are connected by a common serial cable 80. Therefore, the stacking units 3A to 6A and the counting unit 2A are serially connected, and information can be transmitted and received via the common serial cable 80.

Optical sensors 36, 46, 56, 66 are respectively provided in the stacking units 3A to 6A. The optical sensors 36, 46, 56, 66 transmit a detection signal generated when the paper sheet 100 is detected to the control portion 25 of the counting unit 2A via the common serial cable 80.

Further, control portions 34, 44, 54, 64 are respectively provided in the stacking units 3A to 6A. Each of the control portions 34, 44, 54, 64 stores unique unit identification information for identifying the stacking unit 3A to 6A including the control portion, and unit type information (refer to FIG. 18) for determining the type of stacking unit 3A to 6A including the control portion. The control portion 34, 44, 54, 64 transmits the unit identification information and the unit type information together with the detection signal generated by the optical sensor 36, 46, 56, 66 via the common serial cable 80 to the control portion 25 of the counting unit 2A.

The above-mentioned example of unit identification information for identifying a unit includes information such as a unique ID (identifier) of the CPU mounted in each stacking unit and a unique ID of a communication device mounted in each stacking unit. Further, examples of information regarding the unit type for determining the type of unit include information regarding the type of the stacking unit due to the difference in the number of stacking units, the type of the unit due to the difference in the function such as stacking and sealing, and the like. Regarding the transmission of the unique ID, for example, the first (or last) few bytes of the series of information (multiple bytes) to be transmitted may be used as the information indicating the unique ID, or the unique ID information associated with the detection signal of paper sheet may be transmitted separately.

In the embodiment, as shown in FIG. 18, the unit identification information and the unit type are preset for each of the stacking units 3A to 6A. Specifically, the unit identification information "003" and the unit type "stacking unit (4 stacking portions)" are preset in the stacking unit 3A. The unit identification information "001" and the unit type "stacking unit (3 stacking portions)" are preset in the stacking unit 4A. The unit identification information "002" and the unit type "stacking unit (2 stacking portions)" are preset in the stacking unit 5A. The unit identification information "004" and the unit type "stacking unit (1 stacking portion)" are preset in the stacking unit 6A.

Therefore, as shown in FIG. 19, in the paper sheet processing device 1A, the paper sheets 100 are sequentially conveyed along the common conveyance paths 311, 411, 511, and 611 of the respective stacking units 3A to 6A in the connection order setting mode.

First, the paper sheets 100 are conveyed along the common conveyance path 311 of the stacking unit 3A. Then, the detection signal generated by the optical sensor 36 of the stacking unit 3A, the unit identification information "003" from the control portion 34, and information regarding the unit type "stacking unit (4 stacking portions)" are transmitted to the control portion 25 of the counting unit 2A.

Next, the paper sheets 100 are conveyed along the common conveyance path 411 of the stacking unit 4A. Then, the detection signal generated by the optical sensor 46 of the stacking unit 4A, the unit identification information "001" from the control portion 44, and information regarding the unit type "stacking unit (3 stacking portions)" are transmitted to the control portion 25 of the counting unit 2A.

The paper sheets 100 are conveyed along the common conveyance path 511 of the stacking unit 5A. Then, the detection signal generated by the optical sensor 56 of the stacking unit 5A, the unit identification information "002" from the control portion 54, and information regarding the unit type "stacking unit (2 stacking portions)" are transmitted to the control portion 25 of the counting unit 2A.

Finally, the paper sheets 100 are conveyed along the common conveyance path 611 of the stacking unit 6A. Then, the detection signal generated by the optical sensor 66 of the stacking unit 6A, the unit identification information "004" from the control portion 64, and information regarding the unit type "stacking unit (1 stacking portion)" are transmitted to the control portion 25 of the counting unit 2A.

Then, the paper sheets 100 are conveyed to the terminal accommodation cover 7 connected at the end of the counting unit 2A, and the setting of the connection order is completed.

The control portion 25 of the counting unit 2A determines which stacking unit each stacking unit is on the basis of the unit identification information and the unit type information transmitted from the respective control portion 34, 44, 54, 64 of the stacking units 3A to 6A, and stores the connection order of the stacking unit for which this type or the like is determined in the storage unit 35, 45, 55, 65. The control portion 25 sets the connection order of the stacking units 3A to 6A in the order in which the detection signals transmitted from the optical sensors 36, 46, 56, 66 are received.

In the above-described embodiment, the case where a plurality of types of stacking units 3 to 6 (3A to 6A) are sequentially connected to the counting unit 2 (2A) has been described as an example, but the unit connected to the counting unit 2 (2A) is not limited to a stacking unit. For example, a sealing unit having a function of bundling a predetermined number of media with a band may be connected to the counting unit 2 (2A), or a sealing unit or the like may be connected in any combination with a stacking unit or another unit.

In the above-described embodiment, the case where the medium to be conveyed for setting the connection order was the paper sheet 100 was illustrated and described, but the medium is not limited to the paper sheet 100, and may for example be a coin.

The method of connecting units according to the embodiment of the present invention is not limited to the case of setting the connection order of units constituting the medium processing device, and can be applied to the method of connecting units to a device main body in various other devices.

As described above, in the second embodiment, the medium processing device 1A has the following configuration.

(14) The counting unit 2A and the plurality of stacking units 3A to 6A are configured to be connected in series via a common serial cable 80, and the plurality of stacking units 3A to 6A transmit to the counting unit 2A own unique identification information in addition to information indicating the connection order of the stacking units 3A to 6A stored in the storage portions 35, 45, 55, 65 (detection signals of the optical sensors 36, 46, 56, 66).

When the plurality of stacking units 3A to 6A and the counting unit 2A are connected in series, the counting unit 2A cannot recognize from which of the plurality of stacking units 3A to 6A information indicating the connection order has been received. For this reason, the counting unit 2A requires unique identification information for specifying the plurality of stacking units 3A to 6A. Therefore, the plurality of stacking units 3A to 6A transmit to the counting unit 2A own unique identification information in addition to the information indicating own connection order (detection signals of the optical sensors 36, 46, 56, 66), whereby the counting unit 2A, by associating the unique identification information of the plurality of stacking units 3A to 6A and the connection order, can specify the plurality of stacking units 3A to 6A and recognize the connection order. Further, since the counting unit 2A and the plurality of stacking units 3A to 6A can be connected in series, owing to the system configuration the plurality of stacking units 3A to 6A and other expansion units can be expanded indefinitely without being affected by the number of connection ports of the counting unit 2A.

(15) A method of connecting units of the medium processing device 1A that has the counting unit 2A and the plurality of stacking units 3A to 6A connected to this counting unit 2A and that determines the connection order of the plurality of stacking units 3A to 6A with respect to the counting unit 2A (a connection order determination method for the medium processing device 1A), the method being configured to convey the paper sheets 100 to each of the plurality of stacking units 3A to 6A, receive signals output from each of the plurality of stacking units 3A to 6A in accordance with the conveyance of the paper sheets 100, and determine the connection order of the plurality of stacking units 3A to 6A with respect to the counting unit 2A on the basis of the order of signals output from the plurality of stacking units 3A to 6A.

With this configuration, since the medium processing device 1A determines the connection order of the plurality of stacking units 3A to 6A with respect to the counting unit 2A on the basis of the detection signals of the paper sheets 100 received from each of the stacking units 3A to 6A, it is possible to accurately, easily and automatically set the connection order of the plurality of stacking units 3A to 6A with respect to the counting unit 2A. Further, it is not necessary to provide a physical setting means (switch or the like), and the product cost can be reduced.

In the above-described embodiment, a case was illustrated and described in which the device connection state diagram 2412*a* of the counting unit 2, the stacking unit 3, the terminal accommodation cover 7, and the like is displayed in the second display area 2412 of the display screen 241 of the operation display unit 24, but the embodiment is not limited to this example. The control portion 25 may display the device connection state diagram 2412*a* in the first display area 2411 or both the first display area 2411 and the second display area 2412.

With this configuration, the device connection state diagram can be appropriately displayed in at least one of the first display area 2411 and the second display area 2412 even in the case of a device configuration that vertically connects stacking units 3 or the like to the counting unit 2, and the case of a device configuration that horizontally or vertically connects stacking units 3 or the like to the counting unit 2.

In the embodiment described above, the case where the first display area 2411 and the second display area 2412 being orthogonal to each other was described as an example, but the embodiment is not limited to this example. For example, the first display area 2411 and the second display area 2412 may be in contact with each other, or there may be a gap between the first display area 2411 and the second display area 2412, with the respective display areas being adjacent to each other.

Even with this configuration, since the first display area 2411 and the second display area 2412 are arranged so as to extend in the vertical direction and the left-right direction of the display screen 241, it is possible to improve the operability of the function selection buttons 2411*a* to 2411*c* provided in the first display area 2411, and improve the visibility of the device connection state diagram 2412*a* of the counting unit and the stacking units displayed in the second display area 2412.

INDUSTRIAL APPLICABILITY

The present invention may be applied to a medium processing device and a method of connecting units of the medium processing device.

REFERENCE SYMBOLS

1: Medium processing device
2: Counting unit
21: Reception portion
22: Counting main body portion
223: Endo-counting unit conveying mechanism
223*a*: Take-in conveyance path
223*b*: Identification conveyance path
223*c*: Reject side conveyance path
223*d*: Carry-out side conveyance path
23: Reject portion
24: Operation display portion (display device)
241: Display screen
25: Control portion
3 to 6: Stacking unit
30, 40, 50, 60: Stacking main body portion
31, 41, 51, 61: Endo-stacking unit conveying mechanism
311: 411, 511, 611: Common conveyance path
312, 412, 512, 612: Branch conveyance path
32, 42, 52, 62: Stacking portion
33, 43, 53, 63: Impeller
34, 44, 54, 64: Control portion
35, 45, 55, 65: Storage portion
36, 46, 56, 66: Optical sensor
37, 47, 57, 67: Status display portion
100: Paper sheet
P1 to Pn: Connection port

The invention claimed is:

1. A medium processing device comprising:
a first unit; and
a plurality of second units serially connected to one another, wherein only one of the plurality of second units is connected to the first unit,
wherein each of the plurality of second units comprises:
a conveying mechanism configured to convey a medium;
a medium detection portion configured to detect the medium being conveyed by the conveying mechanism and to transmit a signal indicating detection of the medium to the first unit; and
a second unit control portion configured to transmit type information regarding a type of the second unit to the first unit, and
the first unit is configured to transmit the type of one second unit among the plurality of second units based on the type information transmitted from the second unit control portion of the one second unit, and to determine connection order of the one second unit with respect to the first unit, based on the signal transmitted from the medium detection portion of the one second unit.

2. The medium processing device according to claim 1, wherein the first unit is configured to determine the connection order based on order in which the signal transmitted from each media detection portion of the plurality of second units is received.

3. The medium processing device according to claim 1, wherein the first unit is positioned at a higher order than the plurality of second units in a control system of the medium processing device.

4. The medium processing device according to claim 1, wherein the plurality of second units have mutually common functions.

5. The medium processing device according to claim 1, wherein the plurality of second units comprise two units having mutually different functions.

6. The medium processing device according to claim 1, wherein the first unit is a counting unit comprising:
a reception portion configured to receive the medium; and
a conveying portion configured to convey the medium received by the reception portion toward the plurality of second units,
each of the plurality of second units is an expansion unit comprising:
a first conveyance path configured to convey the medium in a first direction;
a second conveyance path configured to convey the medium in a second direction different from the first direction; and
a detection device configured to detect the medium conveyed by the first conveyance path or the second conveyance path and to transmit a signal indicating detection of the medium to the counting unit,
the plurality of expansion units are mutually coupled in a state of at least one of the first conveyance path and the second conveyance path of adjacent expansion units being connected to each other, and
the counting unit is configured to determine connection order of the plurality of expansion units based on order in which the signal transmitted from each detection device of the plurality of expansion units is received.

7. The medium processing device according to claim 1, wherein for each of the plurality of second units, the first unit is configured to notify the second unit corresponding to the connection order of the determined connection order of the second unit.

8. The medium processing device according to claim 7, wherein each of the plurality of second units further comprises a storage portion configured to store the connection order notified from the first unit.

9. The medium processing device according to claim 8, wherein each of the plurality of second units is configured to notify the first unit of the connection order of the second unit itself stored in the storage portion.

10. The medium processing device according to claim 9, wherein each of the plurality of second units is configured to transmit a first signal indicating the connection order of the second unit itself and a second signal indicating the connection order of the second unit itself, and
the first unit is configured to determine whether or not the connection order indicated by the first signal and the connection order indicated by the second signal are the same.

11. The medium processing device according to claim 1, wherein the first unit and the plurality of second units are connected in series; and
each of the plurality of second units is configured to transmit, to the first unit, unique identification information of the second unit itself in addition to information indicating the connection order of the second unit itself stored in the storage portion.

12. The medium processing device according to claim 1, further comprising a display device configured to display information relating to the medium processing device, wherein the display device has a first display area and a second display area that is provided close to or in contact with the first display area, and at least one of the first display area and the second display area is configured to display the determined connection order.

13. The medium processing device according to claim 12, wherein the first display area extends in a vertical direction with respect to a display area of the display device, and the second display area extends in a left-right direction with respect to the display area of the display device, and the second display area is configured to display the connection state between the first unit and the plurality of second units.

14. The medium processing device according to claim 12, wherein the second display area extends from one end of the first display area in the vertical direction in any one direction in the left-right direction.

15. A method of connecting units of a medium processing device, the medium processing device comprising a first unit and a plurality of second units connected in series, wherein only one of the plurality of second units is connected to the first unit, the method comprising:

receiving, from each of the plurality of second units, a signal indicating detection of a medium conveyed by the second unit itself;

receiving, from each of the plurality of second units, type information regarding a type of the second unit; and determining the type of one second unit among the plurality of the second units based on the received type information, and determining connection order of the one second unit among the plurality of the second units with respect to the first unit, based on order of the signal received from the one second unit.

16. The method of connecting units of a medium processing device according to claim 15, wherein the first unit is a counting unit comprising:

a reception portion that configured to receive the media; and a conveying portion configured to convey the medium received by the reception portion toward the plurality of second units, the second unit is an expansion unit comprising:

a conveyance path configured to convey the medium, and a detection device configured to detect the medium conveyed by the conveyance path and to transmit a signal indicating detection of the medium, the plurality of expansion units are mutually coupled in a state of at least one of the first conveyance path and the second conveyance path of adjacent expansion units being connected to each other, the plurality of expansion units are configured to sequentially convey the medium by the conveyance path of each of the plurality of expansion units, each of the plurality of expansion units is configured to detect the medium conveyed by the conveyance path of the expansion unit, and the counting unit is configured to determine connection order of the plurality of expansion units based on order in which the signal transmitted from each detection device of the plurality of expansion units is received.

17. A medium processing device comprising:

a counter; and a plurality of stackers serially connected to one another, wherein only one of the plurality of stackers is connected to the first unit, wherein each of the plurality of stackers comprises:

a conveyor configured to convey a medium;

a medium detector configured to detect the medium being conveyed by the conveyor and to transmit a signal indicating detection of the medium to the counter; and a controller configured to transmit type information regarding a type of the stacker to the counter, and the counter is configured to transmit the type of one stacker among the plurality of stackers based on the type information transmitted from the controller of the one stacker, and to determine connection order of the one stacker with respect to the counter, based on the signal transmitted from the medium detector of the one stacker.

* * * * *